US011902600B2

(12) United States Patent
Stolarz et al.

(10) Patent No.: US 11,902,600 B2
(45) Date of Patent: Feb. 13, 2024

(54) REAL TIME REMOTE VIDEO COLLABORATION

(71) Applicant: Evercast, LLC, Scottsdale, AZ (US)

(72) Inventors: Damien Phelan Stolarz, Los Angeles, CA (US); Roger Patrick Barton, Pacific Palisades, CA (US); Brad Thomas Ahlf, Scottsdale, AZ (US); Chad Andrew Furman, Holyoke, MA (US); Steven Barry Cohen, Long Beach, CA (US)

(73) Assignee: Evercast, LLC, Scottsdale, AZ (US)

( * ) Notice: Subject to any disclaimer, the term of this patent is extended or adjusted under 35 U.S.C. 154(b) by 0 days.

(21) Appl. No.: 17/139,472

(22) Filed: Dec. 31, 2020

(65) Prior Publication Data

US 2021/0258622 A1 Aug. 19, 2021

Related U.S. Application Data

(63) Continuation of application No. 16/794,962, filed on Feb. 19, 2020, now Pat. No. 10,887,633.

(51) Int. Cl.
*H04N 21/2387* (2011.01)
*H04L 9/40* (2022.01)
(Continued)

(52) U.S. Cl.
CPC ... *H04N 21/23439* (2013.01); *H04L 12/1822* (2013.01); *H04L 63/08* (2013.01); *H04L 65/613* (2022.05); *H04L 65/764* (2022.05); *H04N 21/2387* (2013.01); *H04N 21/234363* (2013.01); *H04N 21/234381* (2013.01)

(58) Field of Classification Search
None
See application file for complete search history.

(56) References Cited

U.S. PATENT DOCUMENTS 6,650,338 B1 * 11/2003 Kolarov .................. G06F 3/016
345/619
9,462,350 B1 * 10/2016 Clayton ........... H04N 21/47214
(Continued)

OTHER PUBLICATIONS

International Search Report & Written Opinion for International Application No. PCT/US2021/018638, dated Apr. 29, 2021.

*Primary Examiner* — Joshua Joo
(74) *Attorney, Agent, or Firm* — Athorus, PLLC

(57) ABSTRACT

Described are systems and methods that enable secure real time communication ("RTC") sessions that may be used, for example, for editing and movie production. Client devices may interact with an RTC management system to obtain color calibration information so that the color presented on the different client devices is consistent with each other and corresponds to the intended color of the video for which collaboration is to be performed. In addition, on-going multifactor authentication may be performed for each client device of an RTC session during the RTC session. Still further, to improve the quality of the exchanged video information and to reduce transmission requirements, in response to detection of events, such as a pause event, a high resolution image of a paused video may be generated and sent for presentation on the display of each client device, instead of continuing to stream a paused video.

19 Claims, 13 Drawing Sheets

(51) Int. Cl.
  *H04L 12/18* (2006.01)
  *H04L 65/613* (2022.01)
  *H04N 21/2343* (2011.01)
  *H04L 65/75* (2022.01)

(56) References Cited

U.S. PATENT DOCUMENTS

| | | | |
|---|---|---|---|
| 9,986,000 | B1 | 5/2018 | Mathew |
| 11,082,402 | B2* | 8/2021 | Gorsica, IV ............ G06F 21/35 |
| 11,758,103 | B2* | 9/2023 | Phillips ................ H04N 19/174 |
| | | | 348/39 |
| 2002/0112244 | A1 | 8/2002 | Liou et al. |
| 2005/0246522 | A1* | 11/2005 | Samuelsson ............ G06F 21/53 |
| | | | 713/150 |
| 2008/0151991 | A1 | 6/2008 | Trimeche et al. |
| 2009/0119730 | A1 | 5/2009 | Perlman et al. |
| 2009/0248802 | A1 | 10/2009 | Mahajan et al. |
| 2010/0095340 | A1 | 4/2010 | Ei et al. |
| 2010/0169906 | A1 | 7/2010 | Takahashi |
| 2011/0150433 | A1* | 6/2011 | Alexandrov ............ H04N 19/17 |
| | | | 386/355 |
| 2012/0291080 | A1 | 11/2012 | McCutchen et al. |
| 2013/0031222 | A1 | 1/2013 | Molander |
| 2013/0036168 | A1 | 2/2013 | Upton et al. |
| 2013/0076908 | A1 | 3/2013 | Bratton et al. |
| 2013/0113872 | A1 | 5/2013 | Ting et al. |
| 2013/0129057 | A1 | 5/2013 | Ramage et al. |
| 2013/0138797 | A1* | 5/2013 | Locker ................. H04L 67/143 |
| | | | 709/224 |
| 2013/0208080 | A1 | 8/2013 | Lukasik et al. |
| 2013/0246348 | A1* | 9/2013 | Loo ..................... G06F 15/16 |
| | | | 707/609 |
| 2014/0099071 | A1* | 4/2014 | Adcock ................. H04N 9/87 |
| | | | 386/241 |
| 2014/0181090 | A1 | 6/2014 | Homsany |
| 2015/0220480 | A1 | 8/2015 | Mihara et al. |
| 2015/0244761 | A1 | 8/2015 | Tsyganok et al. |
| 2015/0304851 | A1* | 10/2015 | Chen ................... H04L 63/0853 |
| | | | 713/172 |
| 2016/0140139 | A1 | 5/2016 | Torres et al. |
| 2016/0173705 | A1 | 6/2016 | Nordstrom |
| 2016/0203150 | A1 | 7/2016 | Alten |
| 2016/0378782 | A1 | 12/2016 | Jiang et al. |
| 2017/0091214 | A1 | 3/2017 | Kasterstein et al. |
| 2017/0123751 | A1 | 5/2017 | Sigurosson et al. |
| 2017/0149861 | A1 | 5/2017 | Good |
| 2018/0048679 | A1 | 2/2018 | Huang et al. |
| 2018/0109520 | A1* | 4/2018 | Han ..................... G06F 21/62 |
| 2018/0124046 | A1* | 5/2018 | Verma ................. G06F 16/5838 |
| 2018/0167426 | A1 | 6/2018 | Sigurdsson et al. |
| 2018/0176267 | A1 | 6/2018 | Malatesha et al. |
| 2018/0248892 | A1* | 8/2018 | Hefetz ................. H04L 63/107 |
| 2019/0028891 | A1* | 1/2019 | Suwirya ................ G06F 21/35 |
| 2019/0035433 | A1 | 1/2019 | Kulas |
| 2019/0166206 | A1* | 5/2019 | Trinh ..................... H04W 4/21 |
| 2019/0191210 | A1* | 6/2019 | Xiao .................. H04N 21/23439 |
| 2019/0268314 | A1* | 8/2019 | Li ...................... H04L 63/0442 |
| 2019/0268388 | A1 | 8/2019 | Shamma |
| 2019/0273767 | A1 | 9/2019 | Nelson et al. |
| 2019/0297119 | A1* | 9/2019 | Vashisht ............... H04L 65/1069 |
| 2019/0313252 | A1* | 10/2019 | Ting ..................... H04W 76/10 |
| 2019/0354395 | A1 | 11/2019 | Clark et al. |
| 2020/0358981 | A1* | 11/2020 | Lee ...................... H04W 4/18 |
| 2021/0021625 | A1* | 1/2021 | Hoorvitch ............ H04L 63/1425 |
| 2021/0099501 | A1* | 4/2021 | Sarmova ............. H04N 21/4788 |
| 2021/0126912 | A1* | 4/2021 | MacLean ............. H04L 63/107 |
| 2021/0326956 | A1* | 10/2021 | Kim ................... G06F 16/3331 |
| 2022/0006946 | A1 | 1/2022 | Missig et al. |
| 2022/0067448 | A1* | 3/2022 | Anderson ............ G06F 18/2148 |

* cited by examiner

REAL TIME REMOTE VIDEO COLLABORATION

PRIORITY CLAIM

This application is a Continuation of U.S. patent application Ser. No. 16/794,962, filed Feb. 19, 2020, and titled "Real Time Remote Video Collaboration," the contents of which are herein incorporated by reference in their entirety.

BACKGROUND

The process of creating motion picture and television entertainment is complex and contains many logistical barriers. Productions often involve widely spread locations for filming. Even if productions are filmed in a single location, the post-production tasks involving editing, computer graphics, scoring, sound, color, and review invariably require people in different locations to either meet together or to collaborate remotely. Many of the costs and delays inherent in media production are barriers of time and space.

The result of this are that telepresence tools are more needed than ever to overcome barriers of time and space inherent in production. The challenge of past audio conferencing, video conferencing, and online video collaboration tools is that they are a poor substitute for being physically present. There are various deficiencies in tradition tools used for video conferencing. Cost and complexity are major issues, with many systems requiring expensive hardware installations of cameras and screens and configuration of network environments to support necessary bandwidth.

In addition, both software-based and hardware-based video transmissions systems have latency (delay) and quality issues. Delay manifests in network delays and compression delays that make transmissions not feel instant, with delays exceeding half of a second to more than a second.

There are other problems inherent in remote collaboration. Many media productions have high security requirements due to the amount of investment at stake. Only authorized, trustworthy personnel should be allowed to collaborate on a project, but remote collaboration makes physical enforcement of security (locked doors, physical access controls) impossible.

DETAILED DESCRIPTION

As is set forth in greater detail below, implementations of the present disclosure are directed toward real time communication ("RTC") sessions that allow secure collaboration with respect to video for editing and movie production, for example, in which participants may each be at distinct and separate locations. Collaboration between participants to perform video editing for movie production requires low latency and high quality video exchange between client locations, as well as a secure environment. As discussed further below, client devices may interact with an RTC management system to obtain color calibration information so that the color presented on the different client devices is consistent with each other and corresponds to the intended color of the video for which collaboration is to be performed. Matching color between different locations allows the preservation of the creative intent of content creators. In addition, the disclosed implementations enable an on-going multifactor authentication for each participant to ensure that the participant remains at the client location and viewing the video presented on the client device. Still further, to improve the quality of the exchanged video information and to reduce transmission requirements, in response to detection of events, such as a pause event, a high resolution image of a paused video may be generated and sent for presentation on the display of each client device, instead of continuing to stream a paused video.

Figure 1:
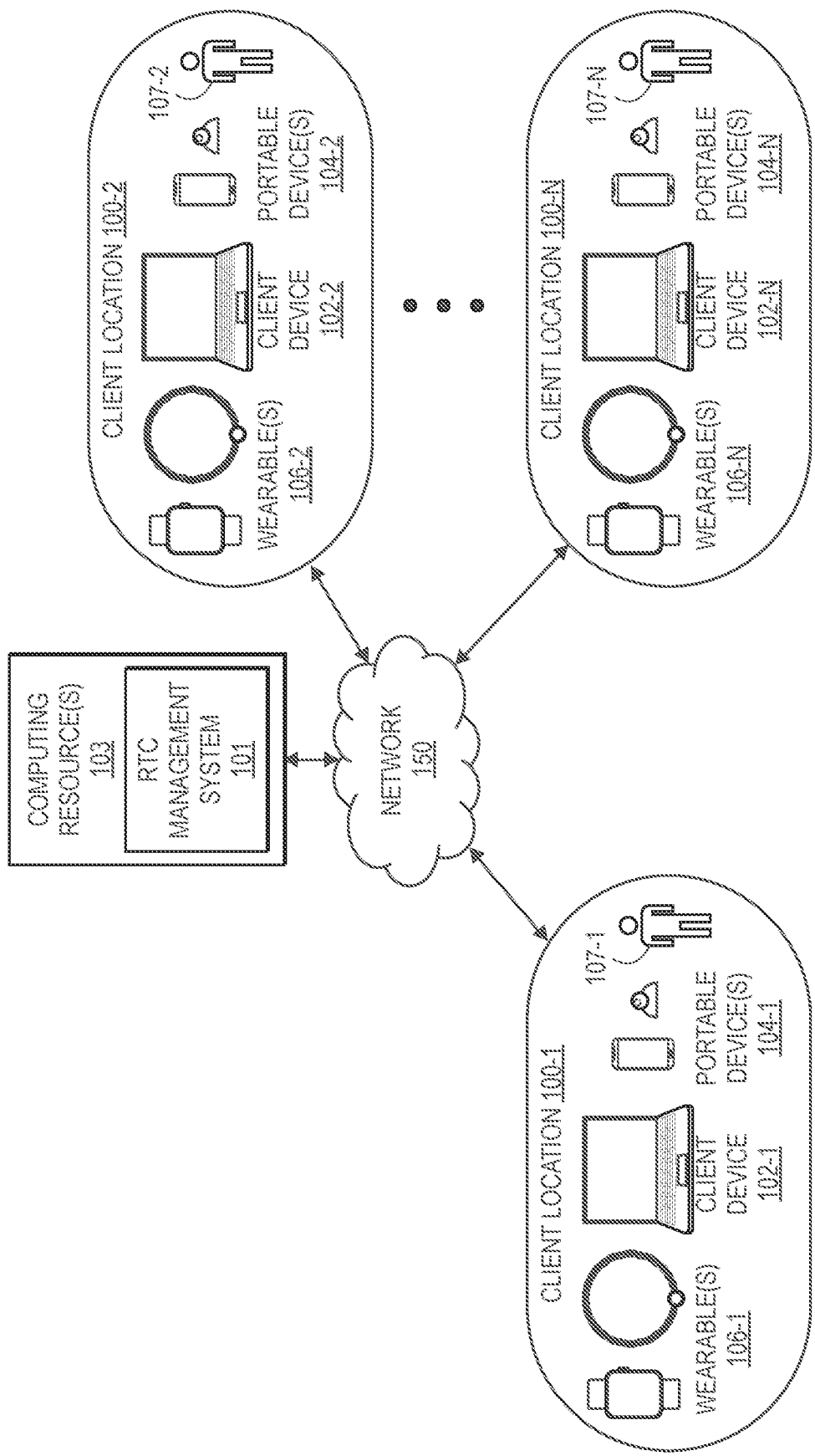
FIG. 1 is an example environment for remote video collaboration, in accordance with implementations of the present disclosure.

FIG. 1 is an example environment for remote video collaboration, in accordance with implementations of the present disclosure.

As illustrated, any number of client locations, such as client locations 100-1, 100-2, through 100-N may communicate and interact with one another and/or a real time communication ("RTC") management system 101 executing on one or more remote computing resources 103. Each of the client locations 100 and the RTC management system 101 may communicate via a network 150, such as the Internet.

Each client location 100 may include a client device 102, one or more portable devices 104 that are owned, controlled, and/or operated by a participant 107, and/or one or more wearable devices 106 that are owned, controlled, and/or operated by the participant 107. A client device 102, as used herein, is any type of computing system or component that may communicate and/or interact with other devices (e.g., other client devices, portables devices, wearables, RTC management system, etc.) and may include a laptop, desktop, etc. A portable device 104, as used herein, includes any type of device that is typically carried or in the possession of a user. For example, a portable device 104 may include a cellular phone, or smartphone, a tablet, a laptop, a webcamera, a digital camera, etc. A wearable device 106, as used herein, is any type of device that is typically carried or worn by a user and may include, but is not limited to, a watch, necklace, ring, etc.

In the illustrated example, client location 100-1 includes a client device 102-1, one or more portable devices 104-1, one or more wearable devices 106-1, and a participant 107-1. Likewise, client location 100-2 includes a client device 102-2, one or more portable devices 104-2, one or more wearable devises 106-2, and a participant 107-2. Any number of client locations 100-N with participants 107-N may be utilized with the disclosed implementations, and each client location may include a client device 102-N, one or more portable devices 104-N, and one or more wearable devices 106-N.

As discussed further below, each client device 102 may be used by a respective participant to access the RTC management system and collaborate on one or more videos exchanged via the RTC management system. Likewise, as discussed further below, portable devices 104 and/or wearable devices 106 may communicate with each other and/or the respective client device 102 and provide ongoing or periodic user identity verification, referred to herein as identity information, to the RTC management system 101. For example, a portable device 104 may wirelessly communicate with the client device using a short wave communication system, such as Bluetooth or Near Field Communication ("NFC"), thereby confirming the presence of the portable device with respect to the location of the client device. Likewise, one or both of the portable devices 104 and the wearable devices 106 may likewise provide position information regarding the position of the portable device 104/wearable device 106 and such information may be used by the RTC management system 101 to verify the location of the participant. Still further one or more of the client device 102, portable device 104, and/or the wearable 106 may provide image data of the participant and/or the area immediately surrounding the participant. Again, such information may be processed to determine the location of the participant, the identity of the participant, and/or whether other individuals at the location may pose a security breach threat.

Still further, as discussed below, the client devices 102 enable participants at each location to collaborate on a video that is streamed or otherwise presented by one of the client devices 102 or the RTC management system 101. As is typical during video collaboration, one participant will request to have the video paused, referred to herein as a trigger event. Upon detection of the trigger event, rather than continue to stream the paused video from one client device to others, a high resolution image, such as an uncompressed image, of the paused video may be obtained or generated and sent to destination client devices and presented on the display of those devices instead of, or over, the paused video. Such an implementation provides a higher resolution image of the video and reduces the transmission demands between client devices and/or the RTC management system. When the video is resumed, another trigger event, the high resolution image is removed from display, and presentation of the streamed video resumes on each of the client devices.

In some implementations, the RTC management system may be streaming a video file and be aware of the current frame of the file that is being streamed and on which frame the visual display is paused. Upon receiving a trigger event, the system may generate and send a high resolution image of the current frame as well as frames before and after the current frame. For example, using the trigger event as an indication of a region of interest in the file, the system may generate send a defined number of high resolution images (first plurality of high resolution images) generated from frames preceding. By providing a defined number of frames before and after the current frame, if a client desires to navigate forward or backwards several frames, the high-resolution frames are available for presentation. Similarly, if the client plays a clip containing the paused frame, the clip will be able to be played back at high resolution using at least all of the frames that have been sent in high resolution. The system can continue to download high-resolution frames to the client around the region of interest as long as the file is paused.

As is known, the Rec. 709 color space, which is commonly used in HDTV, has an expanded range of colors that can be represented, and the Rec. 2020 color space, which is commonly used for Ultra HD, includes an even broader range of colors that it can represent. The wider the color space, the more colors can be represented, and the larger amount of data it requires to represent them. In the disclosed implementations, more bits may be used for each color channel. For example, rather than an 8 bit RGB color channel, the disclosed implementations may utilize 10 bits or 12 bits per channel to represent the red, green and blue components of a pixel. These higher bit per channel allocations can be used to represent so called "high dynamic range" (HDR) content for displays capable of reproducing it.

In some implementations, a user at a device may interact with a color space selection dialog select one of many different display profiles to be used. The display profiles may provide a color look-up table that translates or maps colors from a device independent color space, to the monitor that is being used to view the image, and does the best job it can to accurately represent the intended colors. The better the color reproduction range of the target monitor, the higher the fidelity of the mapping between the source image and the image space. The full range of human color perception can be represented in a device independent color space such as that specified in ACES 1.0 (Academy Color Encoding System) developed by the Academy of Motion Picture Arts and Sciences.

In the process of authoring high resolution, high-dynamic range, deep color content, it is often desirable for users in different locations to have a reference so that they agree on what they are looking at. As a result, users may use color-calibrated monitors of the same manufacturer and/or that are capable of accurately representing the same color space. Thus, if two production personnel at a distance from each other are working in an agreed-upon color space, say, P3, they could transmit images in P3 across a distance and reproduce them at both ends. Alternatively, they could represent the P3 image in the Rec. 2020 color space (which P3 is a subset of) and transmit in Rec. 2020 as the agreed upon reference space, then view the image on an appropriate, agreed upon reference display.

An issue that comes up in sharing content at a distance is that the content is often compressed. In addition to spatial and temporal compression that reduces size and removes information based on changes, another common approach to compressing images is to subsample portions of the image chroma, i.e. allocating more resolution to the luminance portion of an image (in the green spectrum) and lower resolution to the blue and red channels. So-called "4:2:2" sub-sampling allocates half the pixel resolution to red and blue. In comparison, 4:4:4, with no sub-sampling, performs no sub-sampling on pixels.

In order to preserve the maximum amount of visual quality, color precision, and color range in an image, it is preferable to convey image data using as little lossy image compression as possible, ideally none (i.e., a raw image).

Figure 2:
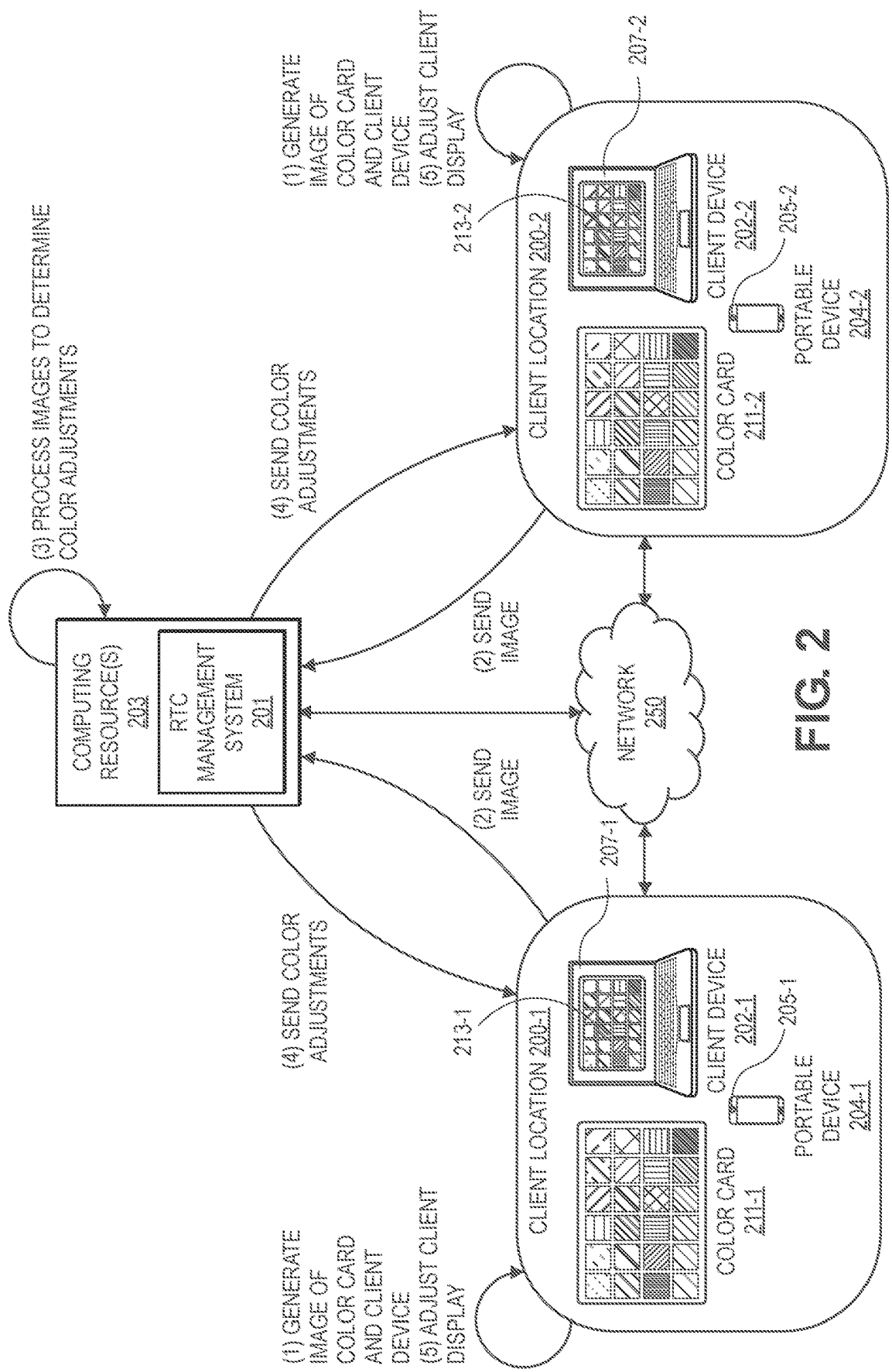
FIG. 2 is a transition diagram of color calibrating client devices at different locations for remote video collaboration, in accordance with implementations of the present disclosure.

FIG. 2 is a transition diagram of color calibrating client devices 202 at different client locations 200 for remote video collaboration, in accordance with implementations of the present disclosure. To enable consistent and accurate color presentation of video between each client device 202 at the different client locations, such as client location 200-1 and 200-2, a physical color card, such as color cards 211-1 and 211-2 may be held up next to a display 207-1/207-2 of the client device 202-1/202-2 that is presenting a series of color bars 213-1/213-2 and an image of the color card 211-1/211-2 and the display 207-1/207-2 with the presented color bars 213-1/213-2 generated by a camera 205-1/205-2 or other imaging element of a portable device 204-1/204-2. For example, the image(s) may be sent from each client location 200-1/200-2 to the RTC management system 201 executing on one or more computing resources 203, via the network 250, such as the Internet.

The RTC management system 201, upon receiving the image(s) from the portable devices 204 may process each image to determine differences between the color card 211 and the color bars 213 represented in the images. For example, an image received from portable device 204-1 may be processed to determine a difference in the color of the color card 211-1 and the color bars 213-1 presented on the display 207-1 of the client device 202-1, as represented in the image. Likewise, an image received from portable device 204-2 may be processed to determine a difference in the color of the color card 211-2 and the color bars 213-2 presented on the display 207-2 of the client device 202-2, as represented in the image. The color card, when captured by the camera of the mobile device, is compared to a reference image and used to create a lighting profile that can be used to compensate for any lighting conditions and determine the range of values that can be accurately captured using that particular camera. In addition, the same camera may be used to capture an image of color bars being rendered on the screen, in the same lighting conditions (but using projected, not reflected light as with the card). The RTC management system 201 can then use the awareness of the capabilities of the camera, to know how the camera alters the colors, to compensate for or cancel out any fidelity issues introduced by the camera and/or the lighting conditions.

The color card 211 may be a passive, physical card, such as a matte or glossy printed medium. The color card may take various forms and include paint, dye, etc., superimposed on a porous surface such as paper or cardboard. The color card may be coated with a matte or reflective coating. In some implementations, the color card may be passive, non-powered card that produces a reflective color response, providing information about the ambient light the space near the screen. Alternately, the color card may be in the form of a translucent image such as a 'gel,' with a backlight. A translucent backlit card allows for transmissive color which may be more representative of the transmissive color of a display, such as an LED or OLED display. In still other examples, the color card may be a digital image projected on a device such as a tablet or smartphone.

In some implementations, processing of the image may result in a gamma adjustment instruction that is provided to the client device 202 to adjust the gamma of the display 207 of the client device 202 so that the color bars 213 presented by the display correspond to the colors of the color card 211. For example, the image received from the portable device 204-1 at the client location 200-1 may be processed to determine a first gamma adjustment instruction and that first gamma adjustment instruction may be sent from the RTC management system 201 to the client device 202-1 to instruct the client device 202-1 to adjust a gamma of the display 207-1. Likewise, the image received from the portable device 204-2 at the client location 200-2 may be processed to determine a second gamma adjustment instruction and that second gamma adjustment instruction may be sent from the RTC management system 201 to the client device 202-2 to instruct the client device 202-2 to adjust a gamma of the display 207-2. These processes may be performed numerous times for each client device 202 at each client location until the color bars presented on the display of each client device 202 correspond to the colors of the respective color cards 211.

In some implementations, to obtain consistency between client devices at different locations, in addition or as an alternative to adjusting the display of each client device 202 so that the color bars presented on the display 207 of the device corresponds to the colors of the respective color card 211, the RTC management system 201 may also compare the color bars presented on the displays of the different client devices to determine color differences between those client devices. For example, after adjusting the gamma of client device 202-1 and the gamma of client device 202-2 so that the color bars of those client devices correspond as close as possible to the colors of the color cards 211-1 and 211-2, the RTC management system may compare the color bars presented by each client device 202-1 and 202-2 to determine any differences between the presented colors of those devices. If a difference is determined, one or both of the client devices may be instructed to further adjust the gamma of the display 207 until the color bars 213-1/213-2 presented on the displays 207-1/207-2 are correlated.

As will be appreciated, the color adjustment between color cards and color bars, as discussed herein, may be performed for a single device communicating with the RTC management system or for any number of client devices communicating with the RTC management system. Likewise, while the above example discusses the RTC management system 201 executing on the computing resources 203 receiving images from portable devices 205 at the various client locations and processing those images to determine gamma adjustment instructions, in other implementations, the images may be processed by the portable device 205 that generated the image and the portable device 205 may determine and provide the gamma adjustment instruction to the client device 202. In still other examples, the portable device 205, upon generating the image of the color card 211 and color bars presented on a display 207 of the client device 202, may provide the image to the client device 202 and the client device may process the image to determine gamma adjustment instructions. In addition, there may be other adjustment parameters besides gamma that improve the color fidelity, and the system may provide adjustment instructions for other adjustable parameters of the client device configuration such as color depth, color lookup table, resolution, subsampling frequency, brightness, saturation, hue, white point, dynamic range, etc.

In some implementations, to obtain consistency between client devices at different locations, in addition or as an alternative to adjusting the display of each client device 202, the two ends will use an identically configured portable device 204 on either end, where the portable devices automatically adjust their own gamma, brightness or other parameters. The portable devices may then use an "augmented reality" approach using an integrated camera to capture and identify the image that is being displayed on the client device, and then connect to the RTC management system 201 to retrieve the same image that is being shown on the client devices 202-1 and 202-2. Each portable device 204 renders a portion of the image being viewed on the client device, much like a "magnifying glass." A user can "pinch/zoom" the image on the portable device. The portable devices, being of the same manufacture, and often having smaller screens for displaying high resolution images using display technologies e.g. Organic LED (OLED), and having higher dynamic range using display features such as High Dynamic Range (HDR). For instance, both ends may have different kinds of displays on client devices 202, but have the same model of modern smartphones as client device 204. Thus, the smartphones may operate as an auto-calibrating, consistent color-reproducing system on both ends of a remote connection, and display a portion of the image corresponding to what is being pointed to on the client devices 202.

In some implementations, the mobile device may also perform the same manual calibration steps using color bars and/or color cards as are used for the client devices. The mobile device may also use a forward facing camera (also known as a "selfie" camera) to measure ambient light and correspondingly adjust the brightness and color of the image on the screen to produce color calibration reference values that result in the same color settings on both ends of a conference.

In some examples, a "blue filter" technique may be utilized for calibration. In such examples, the disclosed implementations may display color bars and then disable the other color channels on the system at the operating system level, or by communicating with the monitor. An external blue filter may be placed between a camera 205 of the portable device 204 and the corresponding client device 202, and the portable device 204 (or the client device 202) may instruct the user to adjust brightness and contrast until the bars presented on the display match. In this way, some of the subjectivity or human error may be eliminated. The portable device 204 may also use its own internal ability to filter only the blue color channel from the images captured, and then instruct the user to adjust brightness and contrast until it is in the correct position for optimal color matching.

In some examples, the portable device 204 may run an application that communicates with an application running on the client device 202 being calibrated, which in turn sends commands to the operating system or attached monitor to automatically adjust the brightness and contrast using a digital interface, until any of the color matching techniques described above are calibrated correctly. Alternately, or in addition thereto, the portable device 204 may provide instructions to the user to accomplish same. Alternately, the portable device 204 may instruct the software on the client device 202 to programmatically select a different color space or color configuration automatically.

Figure 3A:
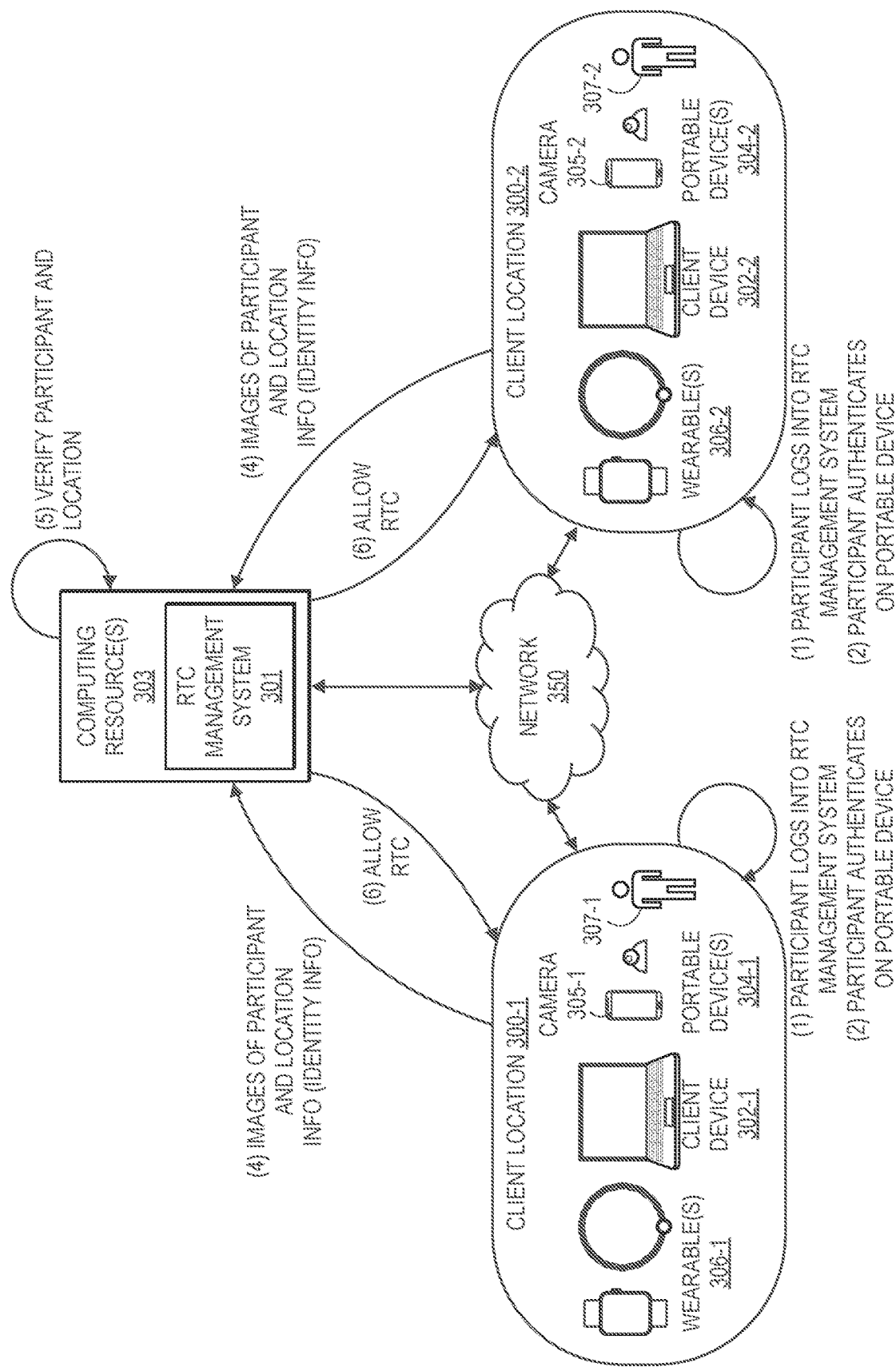
FIGS. 3A through 3B are a transition diagram for continuous security verification of participants at different locations accessing a real time communication system for remote video collaboration, in accordance with implementations of the present disclosure.
Figure 3B:
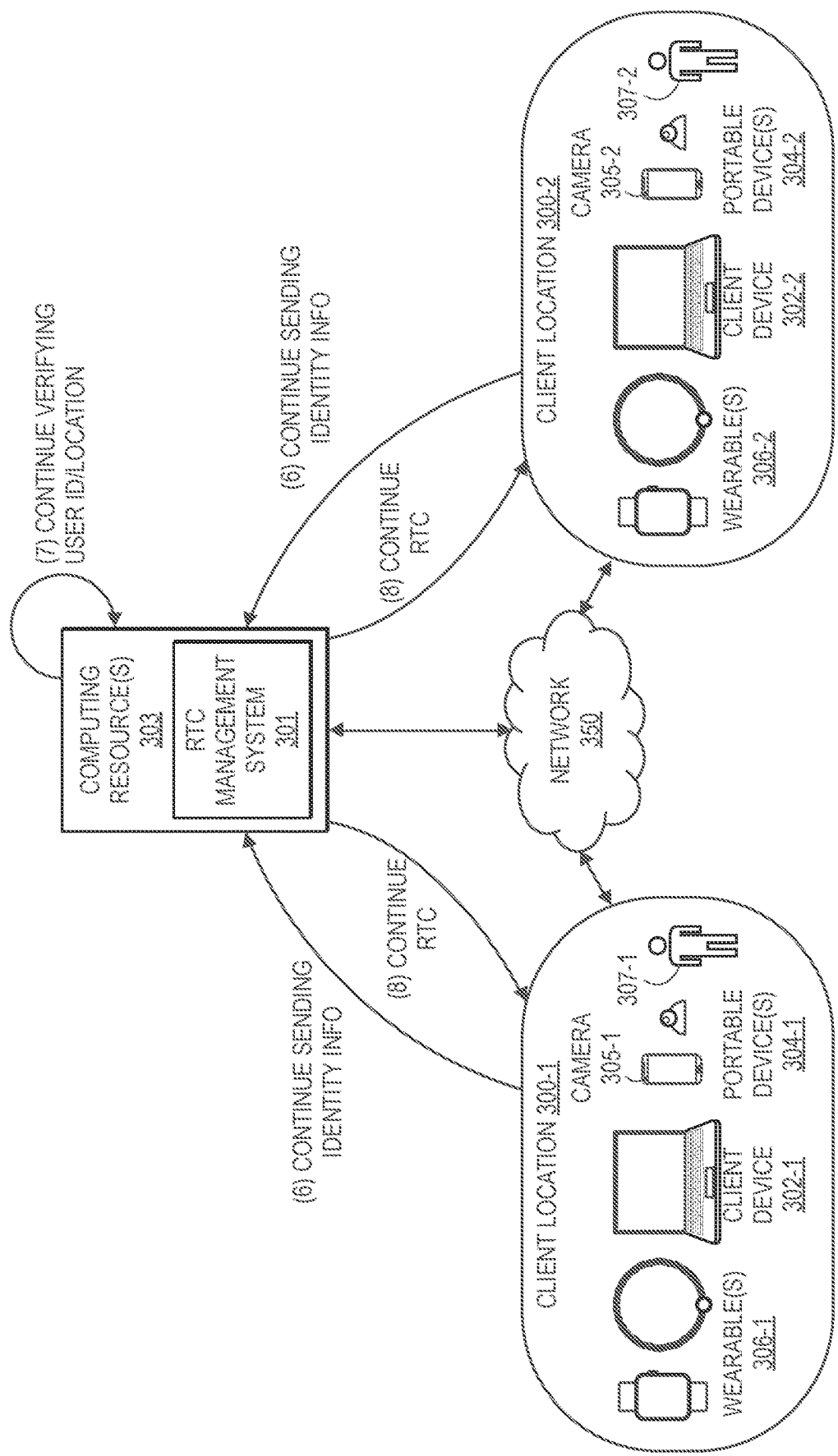

FIGS. 3A through 3B are a transition diagram for on-going security verification of participants 307 at different client locations 300 accessing a real time communication system 301 for remote video collaboration, in accordance with implementations of the present disclosure. The illustrated example is discussed with respect to two client locations 300-1 and 300-2. However, it will be appreciated that any number of client locations may be included in the RTC communication session and on-going security verification performed at each of those locations.

As discussed, the on-going security utilizes multifactor authentication and multiple devices to continually or periodically verify participants of an RTC management system 301. In the illustrated example, a participant 307-1/307-2 accesses and logs into, via a client device 302-1/302-2, at respective client locations 300-1/300-2 the RTC management system 301, which may be executing on one or more computing resources 303. Any form of authentication, such as a username and password, pass phrase, biometric security, USB YubiKey, or other technique may be utilized to enable access or logging into the RTC management system 301 by a participant.

In addition to a participant logging into the RTC management system 301 using a client device, the user may also self-authenticate on a portable device 304-1/304-2 that is in the possession of the participant and local to the client device 302 used by the participant to log into the RTC management system 301. Self-authentication on the portable device 304 may be performed using any one or more self-authentication protocols that are native to the portable device, such as facial recognition, fingerprint or other biometric verification, passcode, etc.

Upon self-authentication, the portable device 304 and the client device 302 may be linked, for example using a short-distance wireless communication link such as Bluetooth, NFC, etc. For example, the participant may launch or otherwise execute an application stored in a memory of the portable device and the application may establish a communication link with an application executing on the client device. During the RTC session, the application executing on the client device 302 may periodically or continuously poll or obtain information (such as keepalives or cryptographic handshakes) from the application executing on the portable device 304 to verify that the portable device is within a defined distance or range of the client device 302.

In addition, as part of RTC communication session establishment and ongoing verification, an image of the participant may be generated by a camera 305-1/305-2 of the portable device 304 and sent to client device 302-1/302-2 and/or the RTC management system 301. The image may be processed to verify the identity of the participant represented in the image, to confirm that the participant is within the defined distance of the client device, and/or to confirm that there are no other individuals within a field of view of the camera of the portable device 304. In addition, location information obtained from one or more location determining elements, such as a Global Positioning Satellite ("GPS") receiver, of the portable device 305 may also be utilized to verify the location of the participant. Image data, location data, and/or other information corresponding to or used to verify the identity and/or location of a participant is referred to herein as identity information.

At initiation and during an RTC session, identity information of the participant may be provided to verify the location and identity of the participant. Once verified, the RTC session is established or allowed to continue between the RTC management system 301 and the client device 302. If, however, the location of the portable device moves beyond a defined distance of a location of the client device 302 and/or the identity of the participant cannot be verified from the identity information, the RTC session is terminated for the client device.

In still other examples, the identity information may be further processed to determine whether any other individuals are present at the client device. If any other individuals are present, that are not also participants, the RTC management session with the client device 302 is terminated.

In some implementations, as still another form of verification, position information and/or movement data from one or more wearable devices 306 may also be included in the identity information and utilized to verify the location and/or identity of the participant. For example, location information obtained from a wearable of the participant may be utilized as another verification point. In other examples, movement data, heart rate, blood pressure, temperature, etc., may be utilized as another input to verify the location, presence, and/or identity of the participant 307.

As illustrated in FIG. 3B, once the RTC session is established, identity information continues to be sent on a continuous or periodic basis from one or more of the client device 302, portable devices(s) 304, and/or wearable(s) 306 and processed by the RTC management system 301 to continue verifying the identity and location of the participant and either continuing to enable the RTC session or terminating the RTC session. For example, one or more of the client device 302-1, portable device(s) 304-1, and/or wearable(s) 306-1 may continuously or periodically send identity information corresponding to the participant 307-1 at client location 300-1 and the RTC management system 301 executing on the computing resource(s) 303 may process the identity information to verify the identity and location of the participant 307-1 so that the RTC session between the RTC management system 301 and the client device 302-1 may continue. Likewise, one or more of the client device 302-2, portable device(s) 304-2, and/or wearable(s) 306-2 may continuously or periodically send identity information corresponding to the participant 307-2 at client location 300-2 and the RTC management system 301, executing on the computing resource(s) 303 may process the identity information to verify the identity and location of the participant 307-2 so that the RTC session between the RTC management system 301 and the client device 302-2 may continue. If the identity information cannot be verified between either the client location 300-1 and/or the client location 300-2, the RTC session with that location is terminated, thereby maintaining security between the RTC management system 301 and the other client locations.

In some implementations, the disclosed implementations may also be utilized to verify the identity and location of a participant accessing the RTC management system such that recorded or stored video data can be provided to the participant for viewing. For example, an editor may generate a segment of a video and indicate that the segment of video is to be viewed by a producer. That segment of video and the intended recipient may be maintained by the RTC management system 301. At some later point in time, when the producer accesses the RTC management system 301 using a client device 302, portable device 304 and/or wearable 306, as discussed above, such that the identity and location of the producer is verified, the RTC management system 301 may allow access to the segment of video by the producer and continually verify the identity and location of the producer as the producer is viewing the segment of content.

In still other examples, upon authentication of the user via the client device and access the RTC management system, an application executing on the client device may monitor for unauthorized activity and prohibit that activity from occurring. For example, the RTC management system may specify that client devices in an RTC session cannot record the session or record what is presented on the display of the client device, etc. During the session, the application monitors the client device for any such activity and prohibits the activity from occurring. In other examples, if the activity is attempted, the application executing on the client device may prohibit the activity and send a notification to the RTC management system. The RTC management system, upon receiving the notification may terminate the RTC session with that client device and/or perform other actions.

Figure 4A:
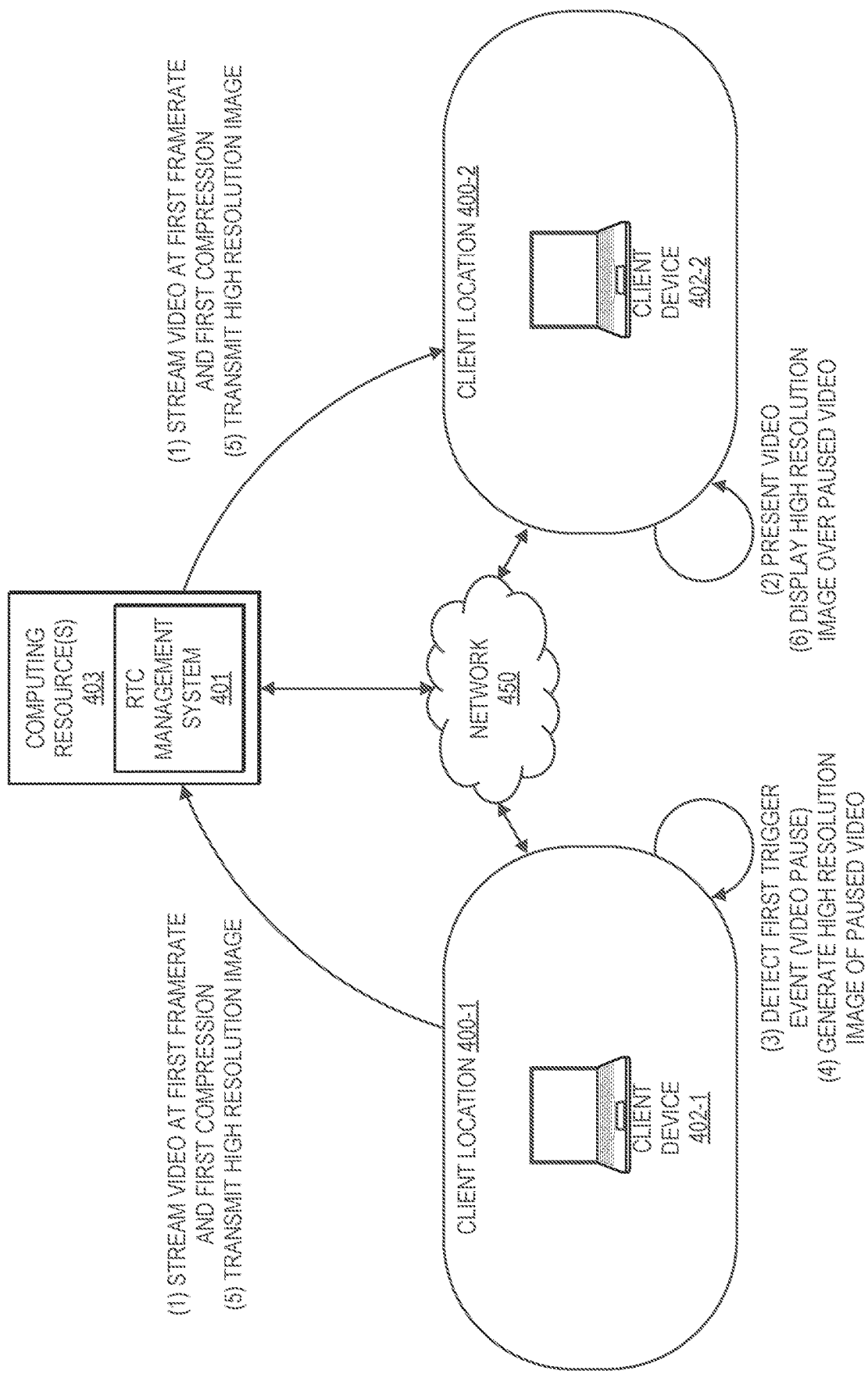
FIGS. 4A through 4B are a transition diagram of real time remote video collaboration, in accordance with implementations of the present disclosure.
Figure 4B:
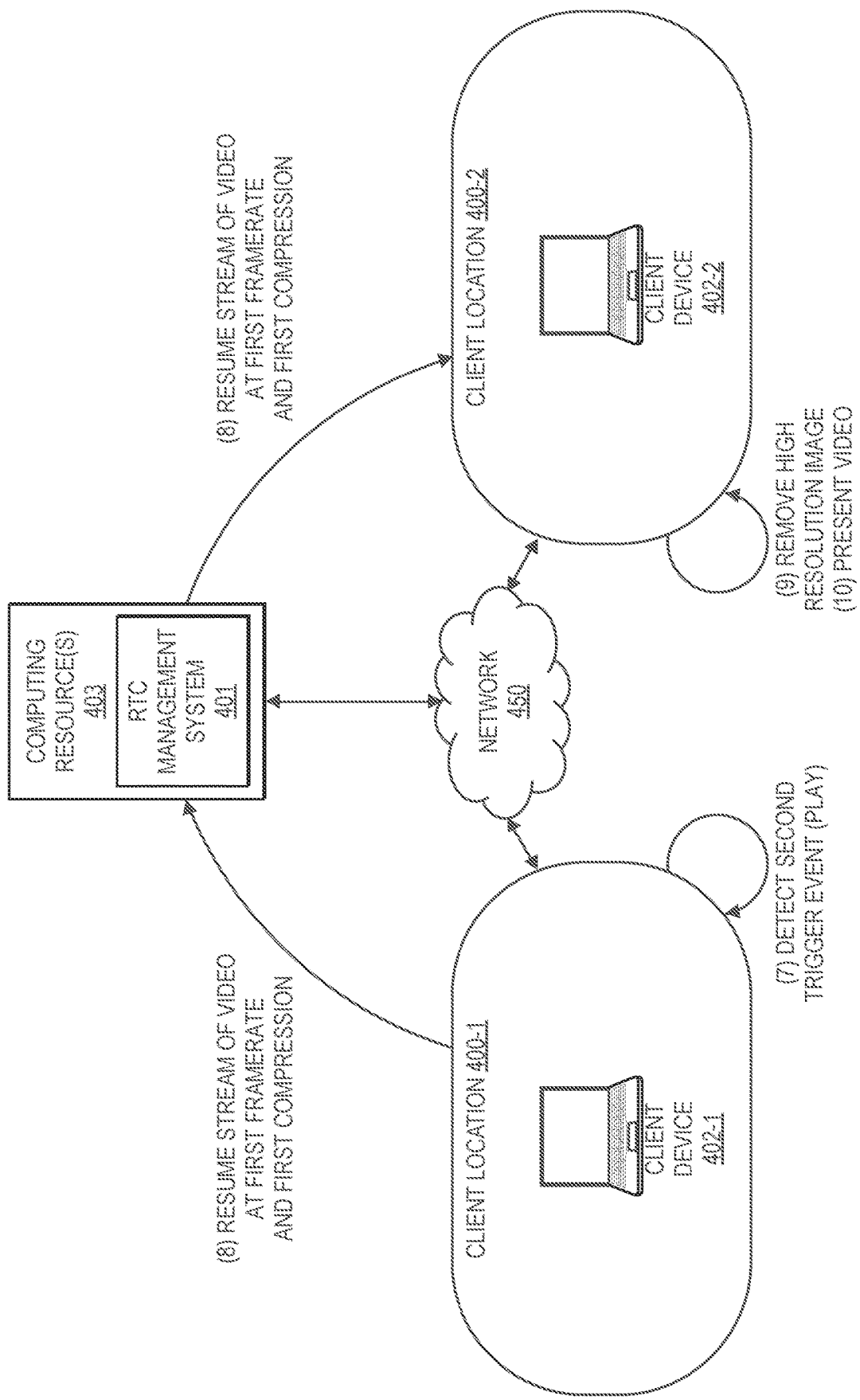

FIGS. 4A through 4B are a transition diagram of real time remote video collaboration, in accordance with implementations of the present disclosure. The example transition discussed with respect to FIG. 4A through 4B may be performed during any RTC session and/or other exchange between two or more client devices 402 and/or an RTC management system 401 executing on the computing resources 403. Likewise, while the example discussed with respect to FIGS. 4A through 4B describe real time remote video collaboration between two client devices 402-1, 402-2 at different client locations 400-1 and 400-2 and via a network 450, it will be appreciated that any number of client devices 402 and client locations 400 may be included and utilized with the disclosed implementations.

In the discussed example, client device 402-1 is streaming a video, such as a pre-release movie production video from client device 402-1, referred to herein as a source device, to client device 402-2, referred to herein as a destination device. As is known in the art, existing systems allow the remote collaboration or sharing of video from one device to another using, for example, webRTC. For example, during movie production, an editor at a source client device 402-1 may remotely connect with a producer at a destination client device 404-2 and the editor may stream video segments at a first framerate and first compression using a first video channel between the source client device and the destination client device, for review and collaboration with the producer. The client device 402-1 may be running streamer software, standalone or embedded into a web browser. This streamer software may stream a file directly, may stream video captured from an external capture device connected to a video source, or may stream a live capture of a screen, a portion of a screen, or a window of a running application on the screen.

As is typical during these collaborations, the producer and/or the editor may request or cause the video to be paused at a particular point in the video, referred to herein as a trigger event. For example, the producer my tell the editor to pause the video. While the video is paused, the producer and editor may collaborate and discuss the video, present visual illustrations on the paused video, which may be transmitted via a second video channel and present as overlays on the streaming video, etc. In existing systems, the webRTC session continues to stream the paused video using the first video channel and at the same framerate and compression, even though the video is paused and not changing.

In comparison, with the disclosed implementations, upon detection of a trigger event, such as a pause of the video, as illustrated in FIG. 4A, a high resolution image of the paused video is generated at the source client device 402-1 and send from the source client device 402-1 to the destination client device 402-2 and the streaming of the video at the framerate and compression is terminated. For example, a high resolution screen shot of the display of the paused video on the display of the source client device 402-1 may be obtained as the high resolution image. In another example, an application executing on the source client device may communicate with a video player or editor application on the source client device 402-1 that is streaming the video and the video player or editor application may generate and provide a high resolution image of the paused instance of the video. In some implementations, the high resolution image may be an uncompressed or raw image of a frame of the video presented on the display when the video is paused.

Continuing with the example, the high resolution image is sent from the source client device 402-1 to the destination client device 402-2, for example through the RTC management system 401 executing on computing resource(s) 403, thereby maintaining security of the RTC session, as discussed above, and the destination client device 402-2, or an application executing thereon, may present the high resolution image on the display of the client device, rather than presenting the paused video. As a result, the participant, such as the producer, is presented with a high resolution image of the paused video, rather than the compressed image included in the video stream. In addition, the continuous streaming of the video at the first framerate and first compression is eliminated, thereby freeing up computing and network capacity. The participants may then collaborate on the high resolution image as if it were the paused video, for exampling discussing and/or visually annotating the high resolution image.

Referring now to FIG. 4B, if a second trigger event is detected, such as a playing of the video, the source client device 402-1 resumes streaming of the video at the first framerate and first compression. Likewise, the destination client device 402-2, upon receiving the resumed video stream, removes the high resolution image from the display of the destination client device 402-2 and resumes presentation of the resumed video stream as it is received.

As will be appreciated, the exchange between streaming video and presentation of a high resolution image may be performed at each trigger event, such as pause/play event and may occur several times during an RTC session.

Figure 5A:
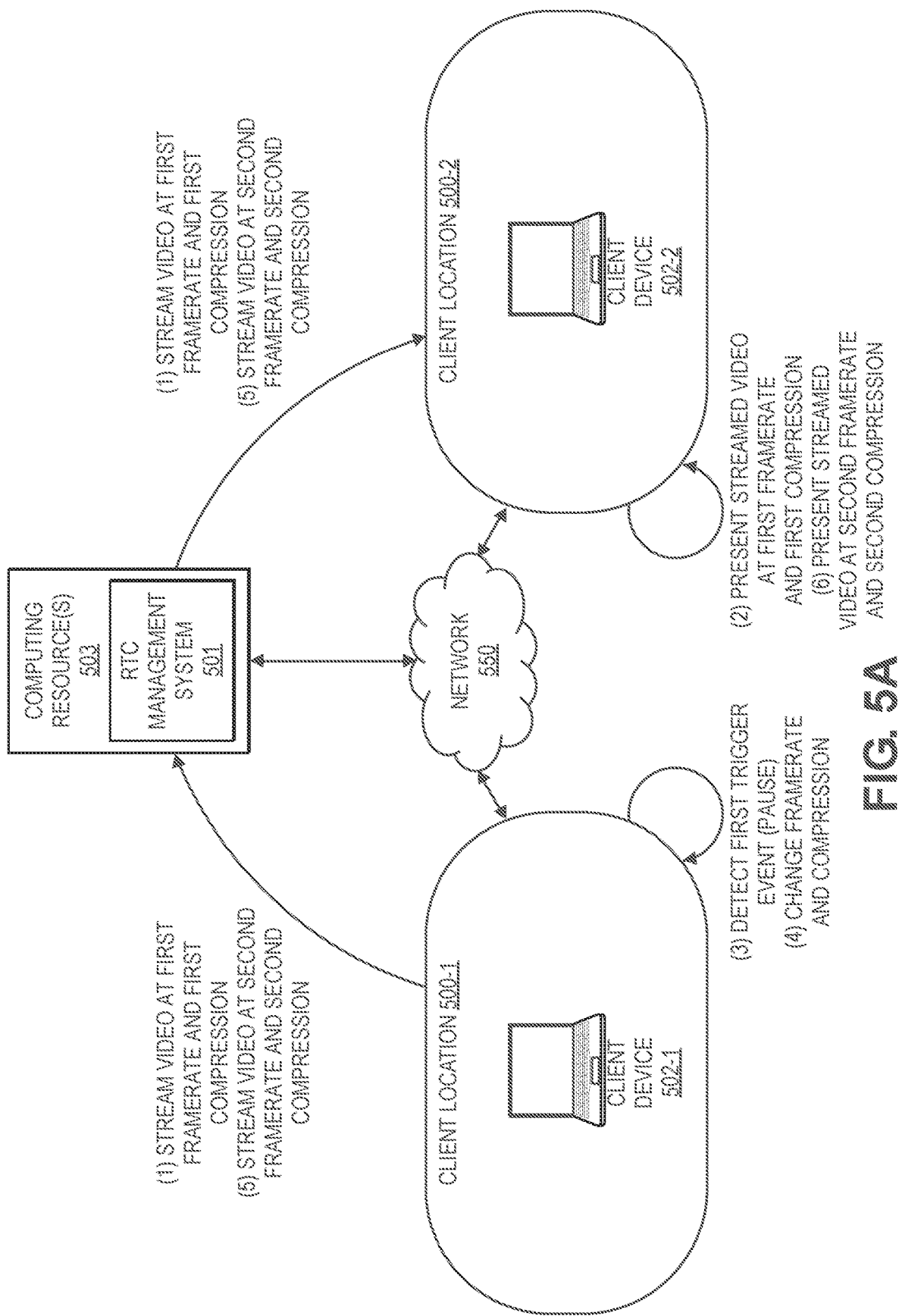
FIGS. 5A through 5B are a transition diagram of another real time remote video collaboration, in accordance with implementations of the present disclosure.
Figure 5B:
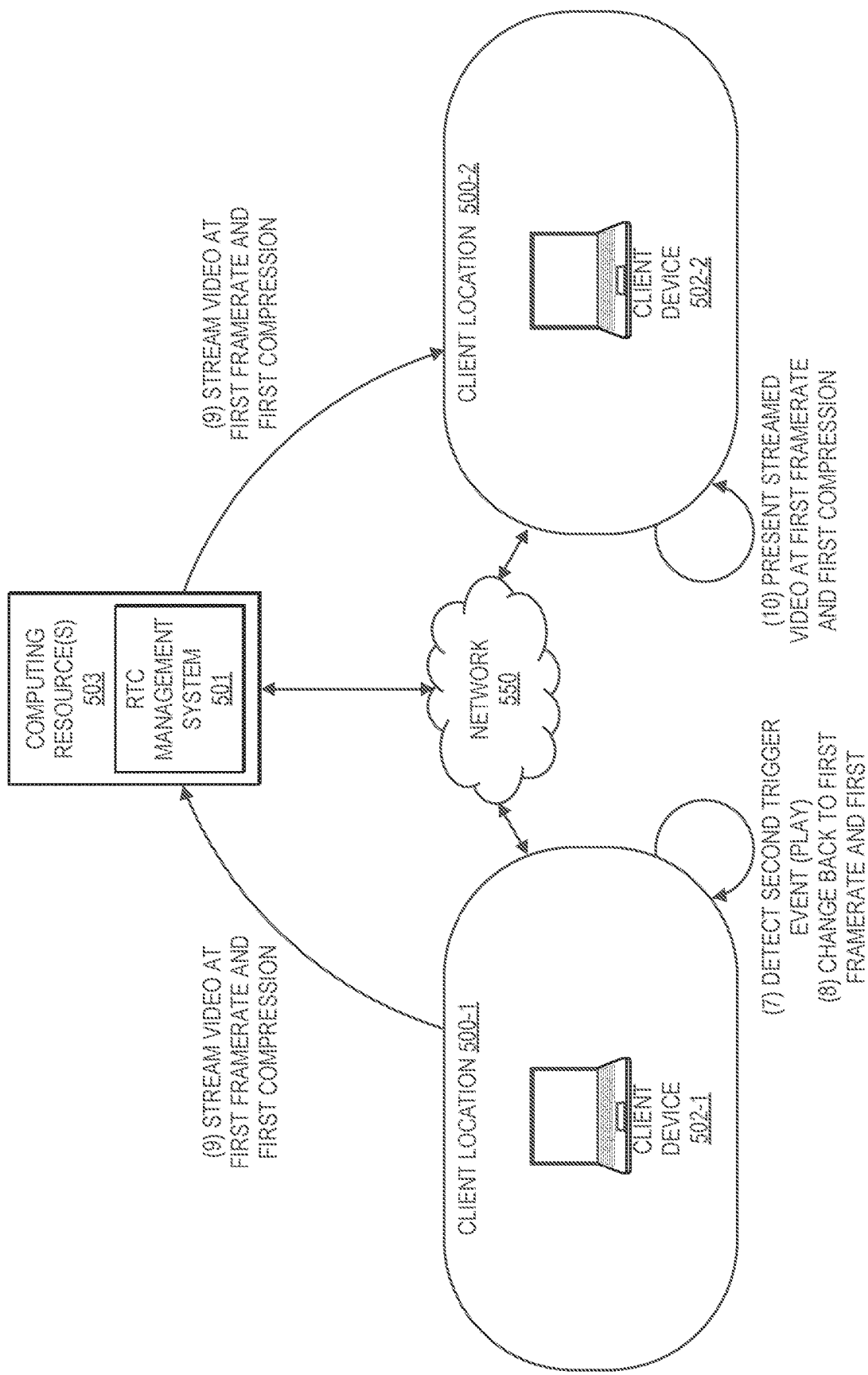

FIGS. 5A through 5B are a transition diagram of another real time remote video collaboration, in accordance with implementations of the present disclosure. The example transition discussed with respect to FIGS. 5A through 5B may be performed during any RTC session and/or other exchange between two or more client devices 502 and/or an RTC management system 501. Likewise, while the example discussed with respect to FIGS. 5A through 5B describe real time remote video collaboration between two client devices 502-1, 502-2 at different client locations 500-1 and 500-2, it will be appreciated that any number of client devices 502 and client locations 500 may be included and utilized with the disclosed implementations.

In the discussed example, client device 502-1 is streaming a video, such as a pre-release movie production video from client device 502-1, referred to herein as a source device, to client device 502-2, referred to herein as a destination device. As is known in the art, existing systems allow the remote collaboration or sharing of video from one device to another using, for example, webRTC. For example, during movie production, an editor at a source client device 502-1 may remotely connect with a producer at a destination client device 502-2 and the editor may stream video segments at a first framerate and first compression using a first video channel between the source client device and the destination client device, for review and collaboration with the producer. For example, the first framerate may be twenty-four frames per second and the first codec may be for example, H.265, H.264, MPEG4, VP9, AV1, etc.

As is typical during these collaborations, the producer and/or the editor may request or cause the video to be paused at a particular point in the video (trigger event). For example, the producer my tell the editor to pause the video. While the video is paused, the producer and editor may collaborate and discuss the video, present visual annotations on the paused video, which may be transmitted via a second video channel and presented as overlays on the streaming video, etc. In existing systems, the webRTC session continues to stream the paused video using the first video channel and at the first framerate and using the first compression, even though the video is paused and not changing.

In comparison, with the disclosed implementations, upon detection of a trigger event, such as a pause of the video, as illustrated in FIG. 5A, the streaming video may be changed to a second framerate and second codec with a different compression and the paused video streamed at the second framerate and second compression while paused. For example, the second framerate may be lower than the first framerate and the second compression may be lower than then first compression. In some implementations, the second compression may be no compression such that the video is streamed uncompressed at the second framerate, which may be a very low framerate. For example, the second framerate may be five frames per second. Lowering the framerate and the compression results in a higher resolution presentation of the paused video at the destination device. As discussed above, altering the framerate and compression is in response to a trigger event. In such an instance, the available bandwidth may remain unchanged.

Continuing with the example, the lower framerate and lower compression video is streamed from the source client device 502-1 to the destination client device 502-2, for example through the RTC management system 501 executing on computing resource(s) 503, thereby maintaining security of the RTC session, as discussed above, the destination client device 502-2, or an application executing thereon, upon receiving the streamed video, may present the streamed video on the display of the destination client device. In such an implementation, the destination client device need not be aware of any change and simply continues to present the streamed video as it is received. Because the video has a lower compression, the participant, such as the producer, is presented which a higher resolution presentation of the paused video. In addition, because the video is paused and not changing, the lower framerate does not cause buffering and/or other negative effects. The participants may collaborate on the higher resolution streamed video, for exampling discussing and/or visually annotating the high resolution image.

Referring now to FIG. 5B, if a second trigger event is detected, such as a playing of the video, the source client device 502-1 resumes streaming of the video at the first framerate and first compression. Because the video has been continuously streamed, although at a lower framerate and lower compression while paused, the destination client device may just continue presenting the streamed video as it is received.

As will be appreciated, the exchange between streaming video at the first framerate and first compressions and streaming video at the second framerate and second compressions may be performed at each trigger event, such as pause/play event and may occur several times during an RTC session.

Figure 6:
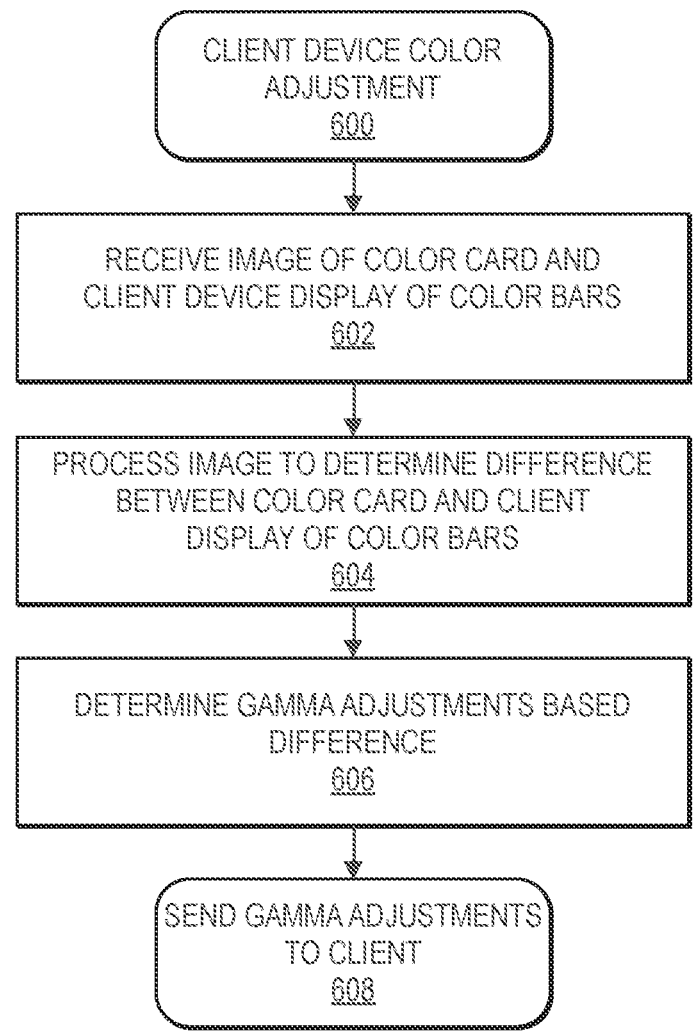
FIG. 6 is a flow diagram of an example client device color adjustment process, in accordance with implementations of the present disclosure.

FIG. 6 is a flow diagram of an example client device color adjustment process 600, in accordance with implementations of the present disclosure. The example process 600 begins upon receipt of an image that includes a representation of a color card, as discussed above, and a presentation of color bars on a display of a client device, as in 602. For example, as discussed above, a participant may hold a color card up next to a display of a client device and generate an image using a portable device, the image including the color card and the display of the client device, upon which color bars are presented.

Upon receipt of the image, the image is processed to determine differences between the colors presented on the color card and the colors of the color bars presented on the display of the client device, as in 604. For example, one or more color matching algorithms may be utilized to compare colors of the color card and the color bars presented on the display of the client device to determine differences therebetween. The receiving application may isolate out a specific color channel, such as blue, and detect differences between the received blue-channel images. The receiving application may compare ambient light in the front-facing camera and compare it with the color bar and card information received from the rear facing camera. The processing algorithm may run on a similar device on both ends, such as a particular model of smartphone with an identical camera system, and thus provide a fairly standardized comparative of both the color calibration of the screen and the colors it displays given the lighting conditions of the environments on both ends. The receiving application may communicate with the device being calibrated, causing it to alter the color bars or other information being shown (color bars can include any desired image for calibration) and alter the colors, the color profile of the device, or the brightness or contrast or other picture settings of the attached monitor, or indicate to the user to alter any of the above settings manually. The receiving device may manipulate the color settings displayed on the device being calibrated to show a changing range of colors so that a full range can be tested by both ends, and may instruct a user to bring the receiving device closer to or farther away from the screen to adjust the ambient light such as by turning off lights in the room, turning them on, closing or opening the blinds, and so on.

Based on the determined difference, a gamma adjustment instruction for the client device is generated, as in 606. As is known in the art, the gamma of a display controls the overall brightness of an image. Gamma represents a relationship between a brightness of a pixel as it appears on a display, and the numerical value of the pixel. By adjusting the gamma of the display, the difference between the color bars presented on the display and the color card may be decreased. Accordingly, the gamma adjustment instruction is sent to the client device for adjustment of the gamma of the display of the client device, as in 608.

As noted above, the example process 600 may be performed numerous times until the difference between the color card and the color bars presented on the display of the client device is negligible or below a defined threshold. The threshold may vary depending upon, for example, the display capabilities of the display of the client device, the video to be streamed, etc.

In some implementations, instead of or in addition to adjusting the gamma based on the color cards, the color bars presented on displays of multiple different client devices may also be compared and gamma adjustment instructions generated and sent to those client devices to adjust those devices so the color bars presented on the displays of those client devices are correlated.

Figure 7:
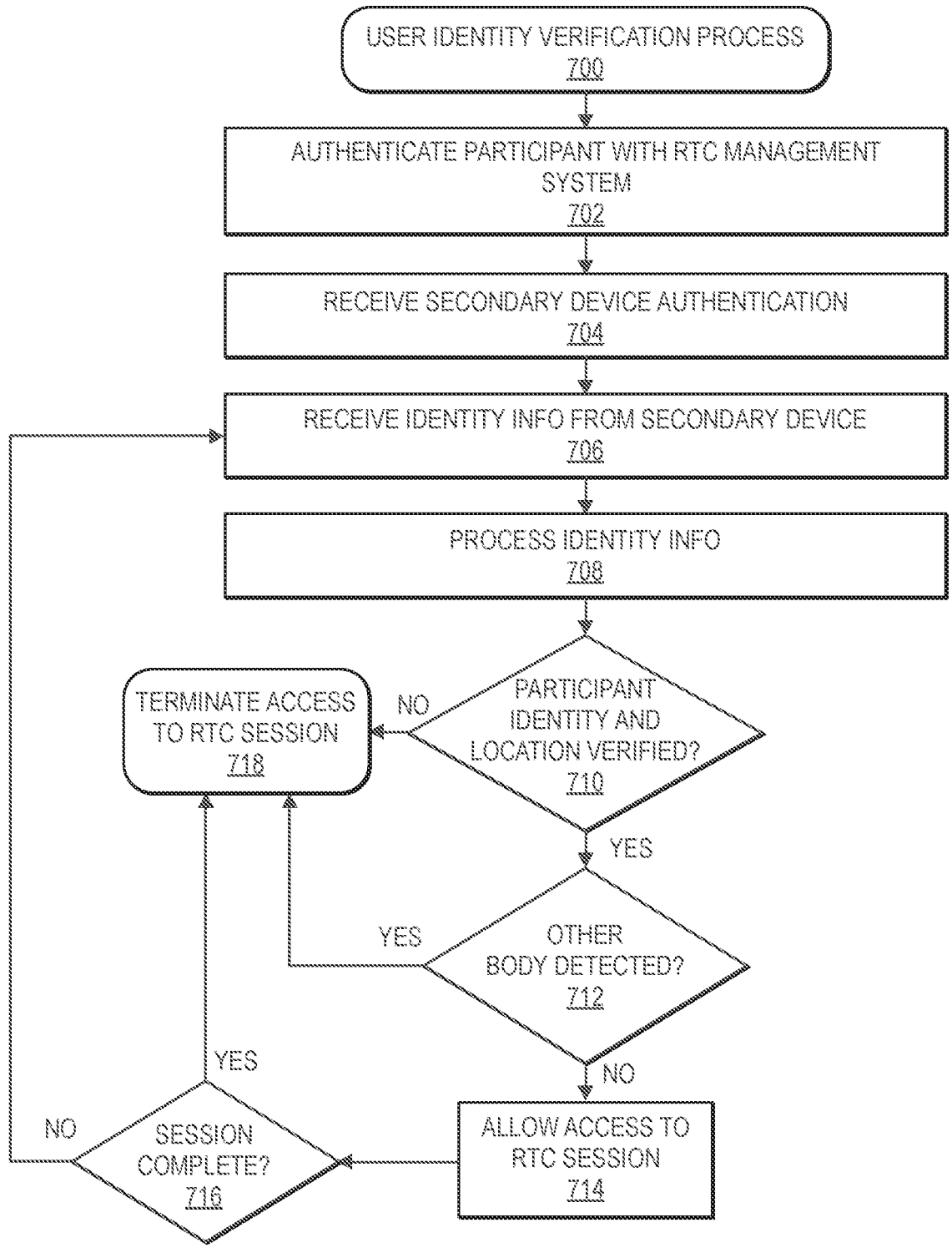
FIG. 7 is a flow diagram of an example user identity verification process, in accordance with implementations of the present disclosure.

FIG. 7 is a flow diagram of an example user identity verification process 700, in accordance with implementations of the present disclosure. The example process 700 may be performed at all times during an RTC session and separately for each participant of the RTC session to continuously or periodically verify the identity of users participating in the RTC session, thereby ensuring the security of the RTC session.

The example process 700 begins when a participant authenticates with the RTC management system, as in 702. For example, a participant, using a client device, may log into the RTC management system by providing a username and password and/or other forms of verification.

In addition to the participant directly authenticating with the RTC management system, the example process receives a secondary device authentication, as in 704. The secondary device authentication may be received from any secondary device, such as a portable device, a wearable device, etc. Likewise, the secondary authentication may be any authentication technique performed by the secondary device and/or an application executing on the secondary device to verify the identity of the participant.

Once the participant has self-authenticated with the RTC management system and secondary authorization has been received, identity information corresponding to the participant may also be received from the secondary device, as in 706. Identity information may include, but is not limited to, location information corresponding to the location of the secondary device and/or the client device, which may be in wireless communication with the secondary device, user biometric information (e.g., heartrate, blood pressure, temperate, etc.), user movement data, images of the user, etc.

In some implementations, system may store the biometrics image of a person that it has not identified, but has been allowed into an RTC Management System conference room by another authorized user. Subsequently, the system may re-identify the same individual using the stored biometrics. The system will create an identity record with metadata of this identified, anonymous, authenticated but unidentified user. They system may also track, for this unidentified user, any time that the user accesses the system and is allowed into the system, so that if the user is later identified, the earlier accesses are matched to the user. This helps preserve an audit trail in the event assets are accessed and later the persons who accessed them need to be identified.

As the identity information is received, the example process 700 processes the received identity information to verify both the location of the participant and the identity of the participant, as in 708. For example, a location of the client device engaged in the RTC session may be determined during initial authentication or via information obtained from the portable device. Likewise, location information from the portable device may be obtained to verify that the portable device has not moved more than a defined distance (e.g. five feet) from the location of the client device. Likewise, identity information generated by the portable device may also be processed to verify that the participant remains with the portable device and thus, the client device.

If it is determined that the identity and location of the participant are verified, as in decision block 710, a determination is made as to whether another body or individual is detected in the identity information, as in 712. For example, if the identity information includes image data of the participant, the image data may be further processed to determine if any other individuals, other than the participant, are represented in the image data. As another example, a motion detection element, such as infra-red scanner, SONAR (Sound Navigation and Ranging, etc.) of the portable device and/or the client device may generate ranging data and that data may be included in the identity information and used to determine if other people are present. If it is determined that no other bodies or individuals are detected, access to the RTC session by the client device is established or maintained, as in 714.

In comparison, if it is determined that either the identity of the user or the location of the user is not verified at decision block 710 and/or that another body or individual is detected in the identity information, at decision block 712, access to the RTC session by the client device is denied or terminated, as in 718.

Finally, the example process 700 also determines if the RTC session has completed, as in 716. If it is determined that the RTC session has not completed, the example process 700 returns to block 706 and continues. If it is determined that the RTC session has completed, access to the RTC session is terminated, as in 718.

Figure 8:
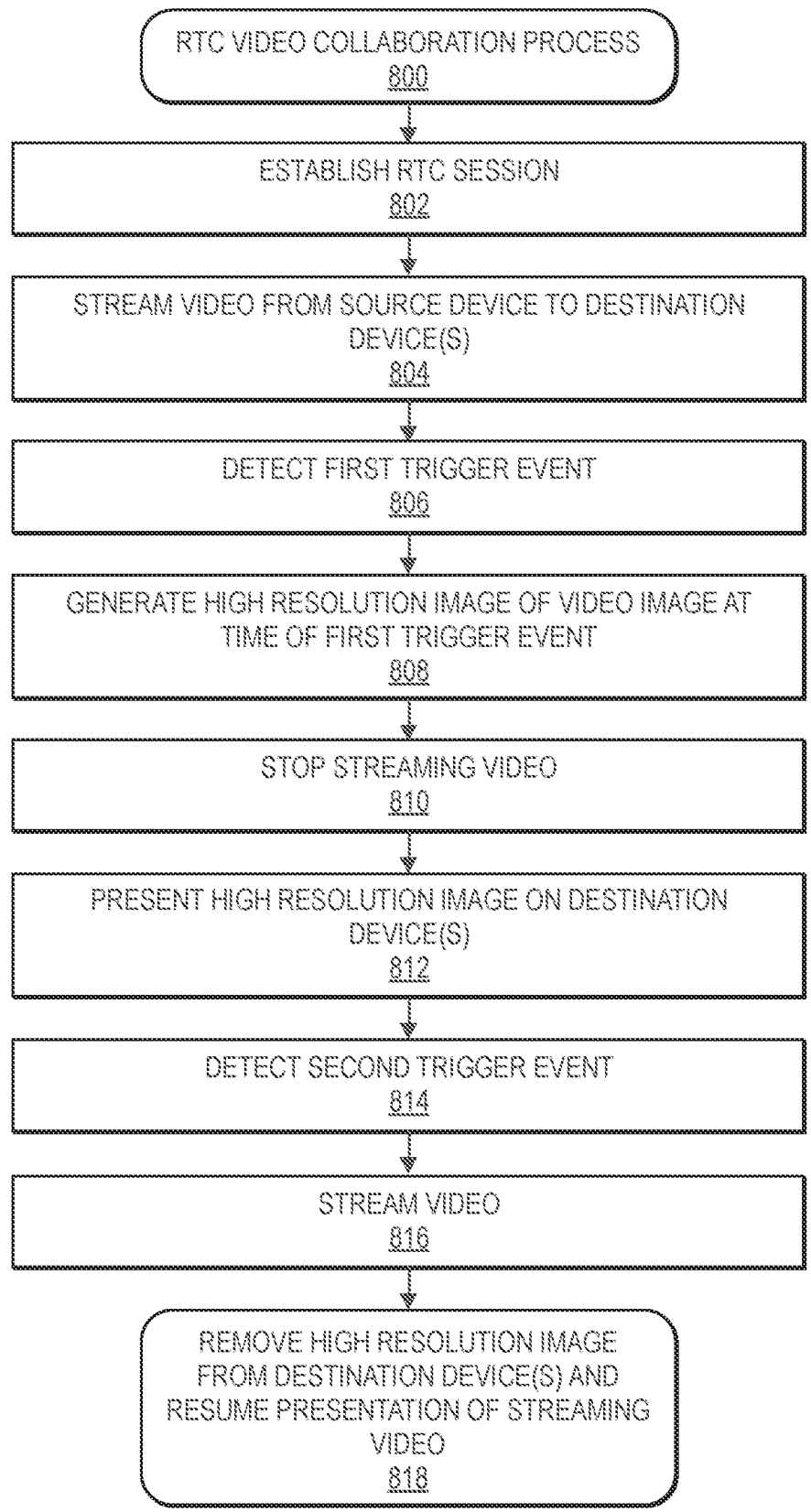
FIG. 8 is a flow diagram of an example real time communication video collaboration process, in accordance with implementations of the present disclosure.

FIG. 8 is a flow diagram of an example real time communication video collaboration process 800, in accordance with implementations of the present disclosure.

The example process 800 begins upon establishment of an RTC session, as in 802. Upon initiation of the RTC session, video is streamed at a first framerate (e.g. 25 frames per second) and a first compression from a source client device to one or more destination client devices, as in 804.

At some point during the RTC session a first trigger event, such as a pause of the streamed video, is detected, as in 806. For example, an editor at the source client device may pause the streamed video. As another example, a participant at one of the destination client devices may cause the streamed video to be paused.

Upon detection of the trigger event, a high resolution image of the paused video is generated at the time of the first trigger event, as in 808. For example, a full resolution screenshot of the display of the source client device that includes the paused video may be generated as the high resolution image. As another example, an application executing on the source client device that is presenting the streaming video, may generate a high resolution image of the video when paused.

In addition, streaming of the now paused video is terminated, as in 810, and the high resolution image is sent from the source client device to the destination client device(s) and presented on the display of the destination client device(s) as an overlay or in place of the terminated streaming video, as in 812. As discussed above, participants of the RTC session may continue to collaborate and discuss the video and the high resolution image provides each participant a higher resolution representation of the paused point of the video.

At some point during the RTC session a second trigger event, such as a play or resume playing of the video is detected, as in 814. For example, a participant at the source client device may resume playing of the video at the source client device. As another example, a participant at one of the destination client devices may cause the video to resume playing.

Regardless of the source of the second trigger event, streaming of the video from the source client device at the first framerate and first compression is resumed, as in 816. Likewise, the high resolution image is removed from the display of the destination client device(s) and the resumed streaming video is presented on those displays, as in 818.

As will be appreciated, the example process 800 may be performed several times during an RTC session, for example, each time a trigger event is detected.

Figure 9:
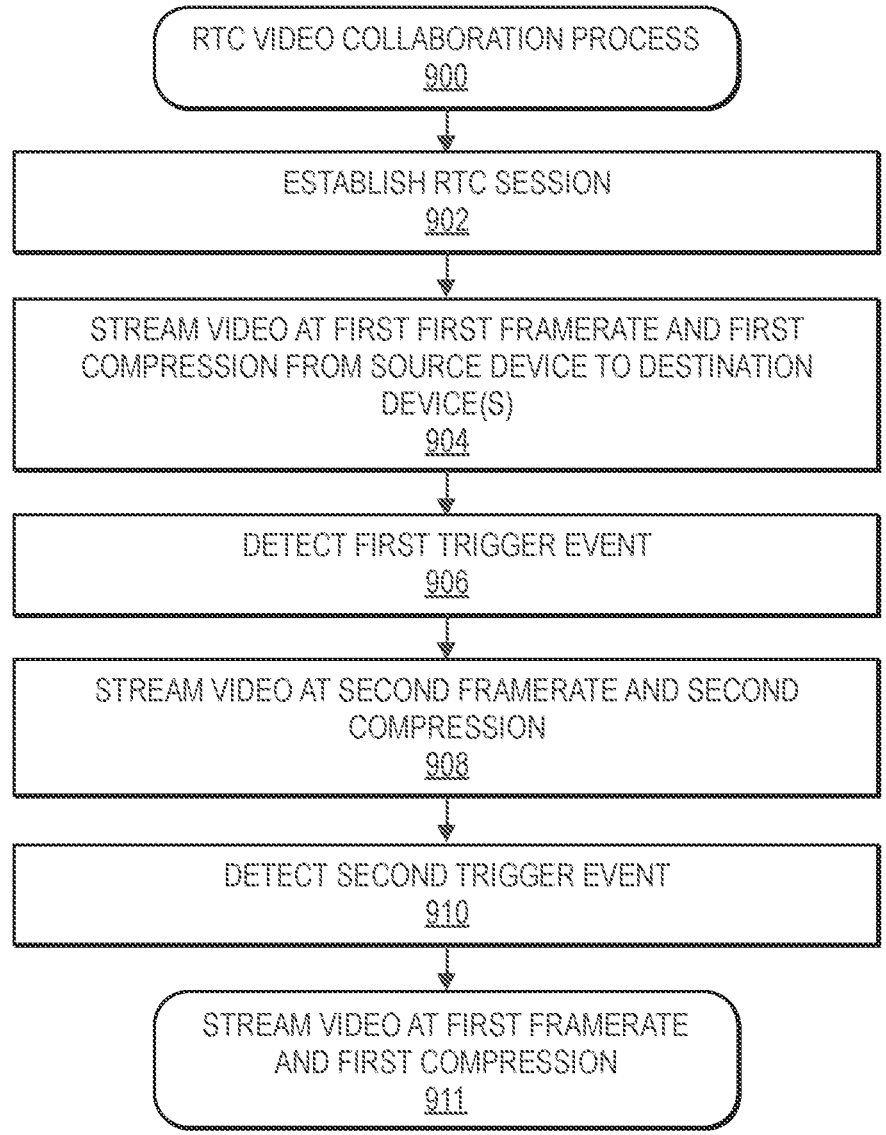
FIG. 9 is a flow diagram of another example real time communication video collaboration process, in accordance with implementations of the present disclosure.

FIG. 9 is a flow diagram of another example real time communication video collaboration process 900, in accordance with implementations of the present disclosure.

The example process 900 begins upon establishment of an RTC session, as in 902. Upon initiation of the RTC session, video is streamed at a first framerate (e.g. 25 frames per second) and a first compression from a source client device to one or more destination client devices, as in 904.

At some point during the RTC session a first trigger event, such as a pause of the streamed video, is detected, as in 906. For example, an editor at the source client device may pause the streamed video. As another example, a participant at one of the destination devices may cause the streamed video to be paused.

Upon detection of the trigger event, the framerate and compression of the streaming video is changed to a second framerate and second compression, as in 908. For example, the second framerate may be lower than the first framerate (e.g., five frames per second) and the second compression may be less than the first compression (e.g., no compression). As a result, the streaming of the video continues, but at a higher resolution while paused. As discussed above, participants of the RTC session may continue to collaborate and discuss the video and the high resolution streamed video provides each participant a higher resolution representation of the video while it is paused.

At some point during the RTC session a second trigger event, such as a play or resume playing of the video is detected, as in 910. For example, a participant at the source client device may resume playing of the video at the source client device. As another example, a participant at one of the destination client devices may cause the video to resume playing.

In response to the second trigger event, streaming of the video at the first framerate and the first compression is resumed, as in 911.

As will be appreciated, the example process 900 may be performed several times during an RTC session, for example, each time a trigger event is detected. Likewise, the example processes 800/900 may be performed at any network bandwidth that supports video streaming and the bandwidth may remain substantially unchanged during the RTC session. Still further, any one or more CODECs (e.g., AV1, H.265, MPEG4, etc.) may be used to compress the video to the first compression and/or the second compression. Still further, while the above example references the video being streamed from a source client device, in other implementations, the video may be streamed from the RTC management system to one or more destination client devices. In such an example, upon detection of a trigger event, the RTC management system may pause the streaming video, generate and send a high resolution image to the one or more client devices. Alternatively, the RTC management system may alter the video stream from a first framerate and first compression to a second framerate and second compression that are different than the first framerate and first compression, as discussed above. Alternatively, the RTC management system may deliver an uncompressed or losslessly compressed or raw version of the video stream or a portion of the video stream around a region of interest indicated by the trigger event.

Figure 10:
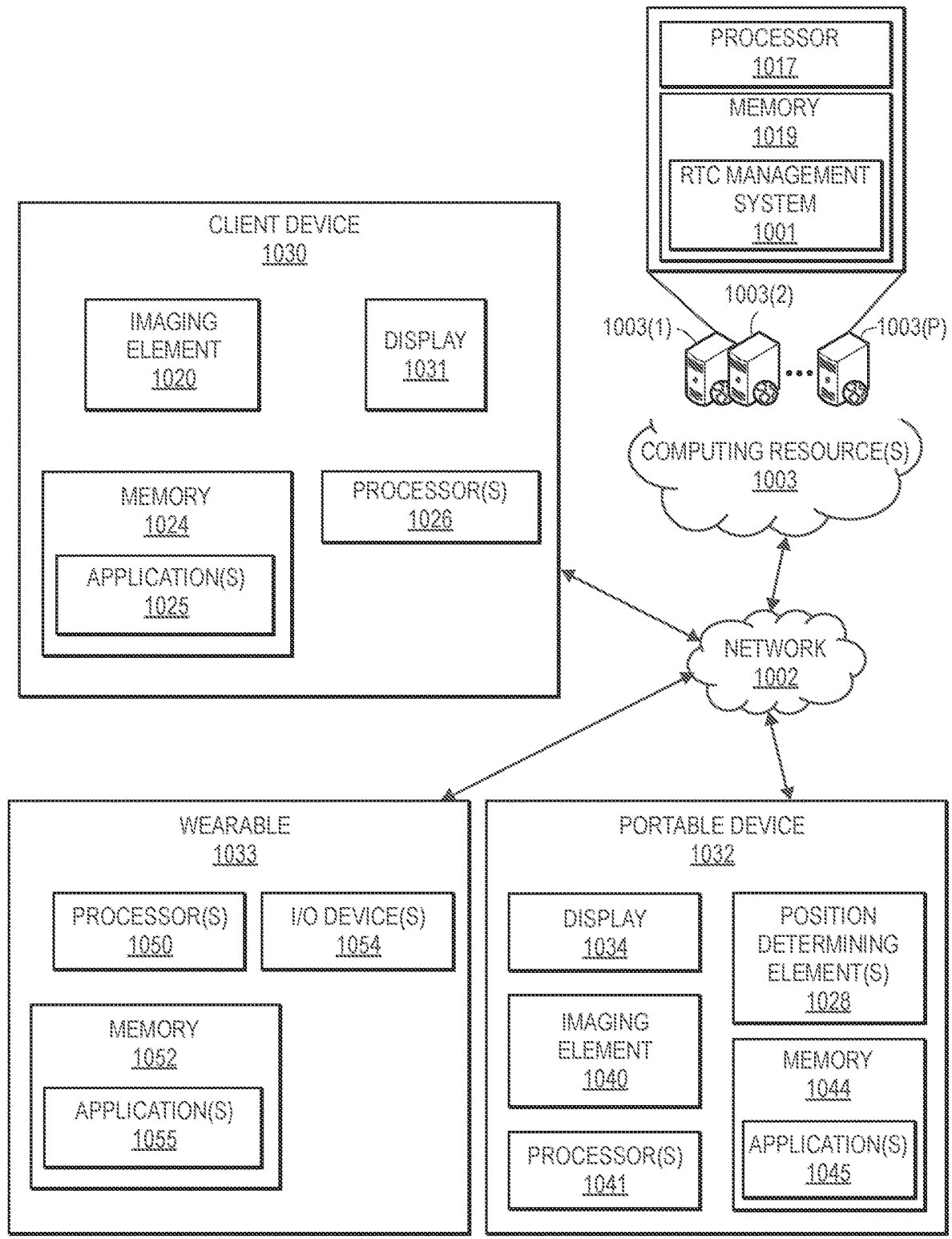
FIG. 10 is a block diagram of computing components that may be utilized with implementations of the present disclosure.

FIG. 10 is a block diagram of example components of a client device 1030, a portable device 1032, a wearable device 1033, and remote computing resources 1003, in accordance with implementations of the present disclosure.

As illustrated, the portable device may be any portable device 1032 such as a tablet, cellular phone, laptop, etc. The imaging element 1040 of the portable device 1032 may comprise any form of optical recording sensor or device that may be used to photograph or otherwise record information or data. As is shown in FIG. 10, the portable device 1032 is connected to the network 1002 and includes one or more memory 1044 or storage components (e.g., a database or another data store), one or more processors 1041, and one or more position/orientation/angle determining elements 1028, an output, such as a display 1034, speaker, haptic output, etc. The portable device 1032 may also connect to or otherwise communicate with the network 1002 through the sending and receiving of digital data.

The portable device 1032 may be used in any location and any environment to generate and send identity information to the RTC management system 1001 and/or to generate images of color cards and the display of a client device 1030. The portable device 1032 may also include one or more applications 1045, such as a steaming video player, identity information collection application, user authentication application, etc., each of which may be stored in memory that may be executed by the one or more processors 1041 of the portable device to cause the processor of the portable device to perform various functions or actions. For example, when executed, the application 1045 may generate image data and location information (e.g., identity information) and provide that information to the RTC management system 1001.

The application 1045, upon generation of identity information, images of a color card and display of the client device 1030, etc., may send the information, via the network 1002, to the RTC management system 1001 for further processing.

The client device 1030, which may be similar to the portable device, may include an imaging element 1020, such as a camera, a display 1031, a processor 1026, and a memory 1024 that stores one or more applications 1025. The application 1025 may communicate, via the network 1002 with the RTC management system 1001, an application 1045 executing on the portable device 1032, and/or an application 1055 executing on the wearable device 1033. For example, the application 1025 executing on the client device 1030 may periodically or continuously communicate with an application 1045 executing on the portable device 1032 and/or an application 1055 executing on the wearable device 1033 to determine the location of the portable device 1032 and/or the wearable device 1033 with respect to the client device 1030. As another example, the application 1025 may send and/or receiving streaming video data and present the same on the display 1031 of the client device 1030. In still other examples, the application 1025 executing on the client device 1030 may change the framerate and/or compression in response to a trigger event and/or generate a high resolution image upon detection of the trigger event and start/stop streaming of the content.

The wearable device 1033 may be any type of device that may be carried or worn by a participant. Example wearable devices include, but are not limited to, rings, watches, necklaces, clothing, etc. Similar to the portable device 1032 and the client device 1030 the wearable device 1033 may include one or more processors 1050 and a memory 1052 storing program instructions or applications that when executed by the one or more processors 1050 cause the one or more processors to perform one or more methods, steps, or instructions. Likewise, the wearable device may include one or more Input/Output devices 1054 that may be used to obtain information about a participant wearing the wearable device and/or to provide information to the participant. For example, the I/O device 1054 may include an accelerometer to monitor movement of the participant, a heart rate, temperature, or perspiration monitor to monitor one or more vital signs of the participant, etc. As another example, the I/O device 1054 may include a microphone or speaker.

Generally, the RTC management system 1001 includes computing resource(s) 1003. The computing resource(s) 1003 are separate from the portable device 1032, the client device 1030 and/or the wearable device 1033. Likewise, the computing resource(s) 1003 may be configured to communicate over the network 1002 with the portable device 1032, the client device 1030, the wearable device 1033, and/or other external computing resources, data stores, etc.

As illustrated, the computing resource(s) 1003 may be remote from the portable device 1032, the client device 1030, and/or the wearable 1033, and implemented as one or more servers 1003(1), 1003(2), . . . , 1003(P) and may, in some instances, form a portion of a network-accessible computing platform implemented as a computing infrastructure of processors, storage, software, data access, and so forth that is maintained and accessible by components/devices of the RTC management system 1001, the portable device 1032, client devices 1030, and/or wearable devices 1033, via the network 1002, such as an intranet (e.g., local area network), the Internet, etc.

The computing resource(s) 1003 do not require end-user knowledge of the physical location and configuration of the system that delivers the services. Common expressions associated for these remote computing resource(s) 1003 include "on-demand computing," "software as a service (SaaS)," "platform computing," "network-accessible platform," "cloud services," "data centers," and so forth. Each of the servers 1003(1)-(P) include a processor 1017 and memory 1019, which may store or otherwise have access to an RTC management system 1001.

The network 1002 may be any wired network, wireless network, or combination thereof, and may comprise the Internet in whole or in part. In addition, the network 1002 may be a personal area network, local area network, wide area network, cable network, satellite network, cellular telephone network, or combination thereof. The network 1002 may also be a publicly accessible network of linked networks, possibly operated by various distinct parties, such as the Internet. In some implementations, the network 1002 may be a private or semi-private network, such as a corporate or university intranet. The network 1002 may include one or more wireless networks, such as a Global System for Mobile Communications (GSM) network, a Code Division Multiple Access (CDMA) network, a Long Term Evolution (LTE) network, or some other type of wireless network. Protocols and components for communicating via the Internet or any of the other aforementioned types of communication networks are well known to those skilled in the art of computer communications and thus, need not be described in more detail herein.

The computers, servers, devices and the like described herein have the necessary electronics, software, memory, storage, databases, firmware, logic/state machines, microprocessors, communication links, displays or other visual or audio user interfaces, printing devices, and any other input/output interfaces to provide any of the functions or services described herein and/or achieve the results described herein. Also, those of ordinary skill in the pertinent art will recognize that users of such computers, servers, devices and the like may operate a keyboard, keypad, mouse, stylus, touch screen, or other device (not shown) or method to interact with the computers, servers, devices and the like.

The RTC management system 1001, the application 1045, the portable device 1032, the application 1025, the client device 1030, the application 1055, and/or the wearable device 1033 may use any web-enabled or Internet applications or features, or any other client-server applications or features including E-mail or other messaging techniques, to connect to the network 1002, or to communicate with one another, such as through short or multimedia messaging service (SMS or MMS) text messages, Bluetooth, NFC, etc. For example, the servers 1003-1, 1003-2 . . . 1003-P may be adapted to transmit information or data in the form of synchronous or asynchronous messages from the RTC management system 1001 to the processor 1041 or other components of the portable device 1032, to the processor 1026 or other components of the client device 1030, and/or to the processor 1050 or other components of the wearable device 1033, or any other computer device in real time or in near-real time, or in one or more offline processes, via the network 1002. Those of ordinary skill in the pertinent art would recognize that the RTC management system 1001 may operate or communicate with any of a number of computing devices that are capable of communicating over the network, including but not limited to set-top boxes, personal digital assistants, digital media players, web pads, laptop computers, desktop computers, electronic book readers, cellular phones, and the like. The protocols and components for providing communication between such devices are well known to those skilled in the art of computer communications and need not be described in more detail herein.

The data and/or computer executable instructions, programs, firmware, software and the like (also referred to herein as "computer executable" components) described herein may be stored on a computer-readable medium that is within or accessible by computers or computer components such as the servers 1003-1, 1003-2 . . . 1003-P, one or more of the processors 1017, 1041, 1026, 1050, or any other computers or control systems, and having sequences of instructions which, when executed by a processor (e.g., a central processing unit, or "CPU"), cause the processor to perform all or a portion of the functions, services and/or methods described herein. Such computer executable instructions, programs, applications, software and the like may be loaded into the memory of one or more computers using a drive mechanism associated with the computer readable medium, such as a floppy drive, CD-ROM drive, DVD-ROM drive, network interface, or the like, or via external connections.

Some implementations of the systems and methods of the present disclosure may also be provided as a computer-executable program product including a non-transitory machine-readable storage medium having stored thereon instructions (in compressed or uncompressed form) that may be used to program a computer (or other electronic device) to perform processes or methods described herein. The machine-readable storage media of the present disclosure may include, but is not limited to, hard drives, floppy diskettes, optical disks, CD-ROMs, DVDs, ROMs, RAMs, erasable programmable ROMs ("EPROM"), electrically erasable programmable ROMs ("EEPROM"), flash memory, magnetic or optical cards, solid-state memory devices, or other types of media/machine-readable medium that may be suitable for storing electronic instructions. Further, implementations may also be provided as a computer executable program product that includes a transitory machine-readable signal (in compressed or uncompressed form). Examples of machine-readable signals, whether modulated using a carrier or not, may include, but are not limited to, signals that a computer system or machine hosting or running a computer program can be configured to access, or including signals that may be downloaded through the Internet or other networks.

Although the disclosure has been described herein using exemplary techniques, components, and/or processes for implementing the systems and methods of the present disclosure, it should be understood by those skilled in the art that other techniques, components, and/or processes or other combinations and sequences of the techniques, components, and/or processes described herein may be used or performed that achieve the same function(s) and/or result(s) described herein and which are included within the scope of the present disclosure.

It should be understood that, unless otherwise explicitly or implicitly indicated herein, any of the features, characteristics, alternatives or modifications described regarding a particular implementation herein may also be applied, used, or incorporated with any other implementation described herein, and that the drawings and detailed description of the present disclosure are intended to cover all modifications, equivalents and alternatives to the various implementations as defined by the appended claims. Moreover, with respect to the one or more methods or processes of the present disclosure described herein, including but not limited to the flow charts shown in FIGS. 6 through 9, orders in which such methods or processes are presented are not intended to be construed as any limitation on the claimed inventions, and any number of the method or process steps or boxes described herein can be combined in any order and/or in parallel to implement the methods or processes described herein. Also, the drawings herein are not drawn to scale.

Conditional language, such as, among others, "can," "could," "might," or "may," unless specifically stated otherwise, or otherwise understood within the context as used, is generally intended to convey in a permissive manner that certain implementations could include, or have the potential to include, but do not mandate or require, certain features, elements and/or steps. In a similar manner, terms such as "include," "including" and "includes" are generally intended to mean "including, but not limited to." Thus, such conditional language is not generally intended to imply that features, elements and/or steps are in any way required for one or more implementations or that one or more implementations necessarily include logic for deciding, with or without user input or prompting, whether these features, elements and/or steps are included or are to be performed in any particular implementation.

The elements of a method, process, or algorithm described in connection with the implementations disclosed herein can be embodied directly in hardware, in a software module stored in one or more memory devices and executed by one or more processors, or in a combination of the two. A software module can reside in RAM, flash memory, ROM, EPROM, EEPROM, registers, a hard disk, a removable disk, a CD-ROM, a DVD-ROM or any other form of non-transitory computer-readable storage medium, media, or physical computer storage known in the art. An example storage medium can be coupled to the processor such that the processor can read information from, and write information to, the storage medium. In the alternative, the storage medium can be integral to the processor. The storage medium can be volatile or nonvolatile. The processor and the storage medium can reside in an ASIC. The ASIC can reside in a device. In the alternative, the processor and the storage medium can reside as discrete components in a device.

Disjunctive language such as the phrase "at least one of X, Y, or Z," or "at least one of X, Y and Z," unless specifically stated otherwise, is otherwise understood with the context as used in general to present that an item, term, etc., may be either X, Y, or Z, or any combination thereof (e.g., X, Y, and/or Z). Thus, such disjunctive language is not generally intended to, and should not, imply that certain implementations require at least one of X, at least one of Y, or at least one of Z to each be present.

Unless otherwise explicitly stated, articles such as "a" or "an" should generally be interpreted to include one or more described items. Accordingly, phrases such as "a device configured to" are intended to include one or more recited devices. Such one or more recited devices can also be collectively configured to carry out the stated recitations. For example, "a processor configured to carry out recitations A, B and C" can include a first processor configured to carry out recitation A working in conjunction with a second processor configured to carry out recitations B and C.

Language of degree used herein, such as the terms "about," "approximately," "generally," "nearly" or "substantially" as used herein, represent a value, amount, or characteristic close to the stated value, amount, or characteristic that still performs a desired function or achieves a desired result. For example, the terms "about," "approximately," "generally," "nearly" or "substantially" may refer to an amount that is within less than 10% of, within less than 5% of, within less than 1% of, within less than 0.1% of, and within less than 0.01% of the stated amount.

Although the invention has been described and illustrated with respect to illustrative implementations thereof, the foregoing and various other additions and omissions may be made therein and thereto without departing from the spirit and scope of the present disclosure.

What is claimed is:

1. A computer-implemented method, comprising:
   obtaining, from a first client device, a first authentication;
   verifying the first authentication obtained from the first client device;
   obtaining, from a second client device, a second authentication;
   verifying the second authentication obtained from the second client device;
   establishing, based at least in part on the verification of the first authentication and the verification of the second authentication, a real-time communication ("RTC") session between the first client device and the second client device to enable collaboration in connection with a content between the first client device and the second client device, wherein the RTC session enables:
     streaming the content to the second client device at a first framerate and a first compression as the content is presented on the first client device;
     detecting an event in connection with the content; and
     in response to detecting of the event:
       pausing the content on a current frame and presenting a high-resolution image of the paused frame on the second client device; and
       transmitting, to the second client device, a plurality of high-resolution images that corresponds to at least one frame preceding the paused frame and to at least one frame following the paused frame, so as to enable navigation between the plurality of high-resolution images and the high-resolution image of the paused frame;
   obtaining, from a first secondary device, a third authentication;
   verifying the third authentication obtained from the first secondary device;
   establishing, based at least in part on the verification of the third authentication, a first link between the first client device and the first secondary device;
   obtaining, from a second secondary device, a fourth authentication;
   verifying the fourth authentication obtained from the second secondary device;
   establishing, based at least in part on the verification of the fourth authentication, a second link between the second client device and the second secondary device;
   periodically during the RTC session:
     obtaining a first periodic verification information from the first secondary device;
     verifying the first periodic verification information obtained from the first secondary device;
     obtaining a second periodic verification information from the second secondary device;
     verifying the second periodic verification information obtained from the second secondary device; and
     maintaining the RTC session based at least in part on the verification of the first periodic verification information and the verification of the second periodic verification information.

2. The computer-implemented method of claim 1, wherein at least one of the third authentication, the fourth authentication, the first periodic verification information, or the second periodic verification information includes at least one of:
   a biometric information;
   an image;
   a location information; or
   a movement information.

3. The computer-implemented method of claim 1, wherein at least one of the first link or the second link is established via Bluetooth or near-field-communications.

4. The computer-implemented method of claim 1, further comprising:
   obtaining, during the RTC session, a third periodic verification information from the first secondary device;
   determining that the third periodic verification information cannot be verified; and
   in response to determining that the third periodic verification information cannot be verified, terminating the RTC session with respect to the first client device.

5. A computer-implemented method, comprising:
   obtaining, from a first client device, a first authentication;
   verifying the first authentication obtained from the first client device;
   establishing, based at least in part on the verification of the first authentication, a real-time communication ("RTC") session in connection with the first client device and a second client device to enable collaboration between the first client device and the second client device in connection with a content, wherein the RTC session enables:
     streaming the content to the second client device at a first framerate and a first compression as the content is presented on the first client device;
     detecting an event in connection with the content; and
     in response to detecting of the event:
       pausing the content on a current frame and presenting a high-resolution image of the paused content on the current frame on the second client device; and
       transmitting, to the second client device, a plurality of high-resolution images that corresponds to at least one frame preceding the paused frame and to at least one frame following the paused frame, so as to enable navigation between the plurality of high-resolution images and the high-resolution image of the paused frame;
obtaining, from a first secondary device and during the RTC session, a first periodic identity information;
verifying the first periodic identity information obtained from the first secondary device; and
maintaining the RTC session based at least in part on the verification of the first periodic identity information.

6. The computer-implemented method of claim 5, wherein the first authentication includes location information, and verification of the first authentication includes verifying a location of the first client device.

7. The computer-implemented method of claim 5, further comprising:
obtaining, from the first secondary device and during the RTC session, a second periodic identity information;
determining that at least one of a location of the first secondary device or an identity of a user associated with the first secondary device cannot be verified; and
in response to determining that at least one of a location of the first secondary device or an identity of a user associated with the first secondary device cannot be verified, terminating the RTC session with respect to the first client device.

8. The computer-implemented method of claim 7, wherein determining that the location of the first secondary device cannot be verified includes determining that the first secondary device is not located within a defined distance from the first client device.

9. The computer-implemented method of claim 7, wherein the second periodic identity information includes an image, and wherein determining that the identity of the user associated with the first secondary device cannot be verified includes determining that the image includes a representation of an individual different than a verified user associated with at least one of the first client device or the first secondary device.

10. The computer-implemented method of claim 5, wherein the first periodic identity information includes at least one of:
a biometric information;
an image;
a location information; or
a movement information.

11. The computer-implemented method of claim 5, further comprising:
obtaining, by the first client device and during the RTC session, a request for an unauthorized activity; and
preventing, by the first client device, a performance of the unauthorized activity.

12. The computer-implemented method of claim 11, further comprising:
obtaining, from the first client device and during the RTC session, an indication of the request for the unauthorized activity; and
terminating, based at least in part on the indication of the request for the unauthorized activity, the RTC session with respect to the first client device.

13. The computer-implemented method of claim 5, further comprising:
storing, prior to establishing the RTC session, the content; and
subsequent to verification of the first periodic identity information, providing access to the content via the first client device.

14. The computer-implemented method of claim 5, further comprising:

obtaining, from the second client device, a third authentication;
verifying the third authentication obtained from the second client device;
establishing, based at least in part on the verification of the third authentication, the RTC session between the first client device and the second client device;
obtaining, from a second secondary device, a second periodic identity information from the second secondary device;
verifying the second periodic identity information obtained from the second secondary device; and
maintaining the RTC session based at least in part on the verification of the second periodic identity information.

15. A computing system, comprising:
one or more processors; and
a memory storing program instructions that, when executed by the one or more processors, cause the one or more processors to at least:
obtain, from a first client device, a client authentication;
verify the client authentication obtained from the first client device;
establish, based at least in part on the verification of the client authentication, a real-time communication ("RTC") session in connection with the first client device and a second client device to enable collaboration between the first client device and the second client device in connection with a content, wherein the RTC session enables:
streaming the content to the second client device at a first framerate and a first compression as the content is presented on the first client device;
detecting an event in connection with the content;
in response to detecting of the event:
pausing the content and presenting a high-resolution image of a paused frame of the paused content on the second client device; and
transmitting, to the second client device, a plurality of high-resolution images that corresponds to at least one frame preceding the paused frame and to at least one frame following the paused frame, so as to enable navigation between the plurality of high-resolution images and the high-resolution image of the paused frame;
periodically during the RTC session:
obtain, from a secondary device, a first periodic identity information;
verify the first periodic identity information obtained from the secondary device; and
maintain the RTC session based at least in part on the verification of the first periodic identity information.

16. The computing system of claim 15, wherein the client authentication includes location information, and verification of the client authentication includes verifying a location of the first client device.

17. The computing system of claim 15, wherein the program instructions further include instructions that, when executed by the one or more processors, further cause the one or more processors to at least:
store biometric information associated with an unidentified individual; and
track, using the stored biometric information, access to the computing system by the unidentified individual.

18. The computing system of claim 15, wherein the program instructions further include instructions that, when executed by the one or more processors, further cause the one or more processors to at least:

obtain, from the secondary device and during the RTC session, a second periodic identity information;
verify the second periodic identity information; and
maintain the RTC session based at least in part on the verification of the second periodic identity information, wherein the verification of the second periodic identity information includes verification of at least one of a location of the secondary device or an identity of a user associated with at least one of the first client device or the secondary device.

19. The computing system of claim 18, wherein the second periodic identity information includes ranging data generated by a motion detector.

* * * * *